United States Patent
Bekara

(10) Patent No.: US 12,546,909 B2
(45) Date of Patent: Feb. 10, 2026

(54) SYSTEM AND METHOD FOR GENERATING SOURCE ACTIVATION TIMES OR LOCATIONS IN BLENDED MARINE SEISMIC ACQUISITIONS

(71) Applicant: PGS Geophysical AS, Oslo (NO)

(72) Inventor: Maiza Bekara, Weybridge (GB)

(73) Assignee: PGS Geophysical AS, Oslo (NO)

( * ) Notice: Subject to any disclaimer, the term of this patent is extended or adjusted under 35 U.S.C. 154(b) by 145 days.

(21) Appl. No.: 18/613,606

(22) Filed: Mar. 22, 2024

(65) Prior Publication Data

US 2024/0329269 A1     Oct. 3, 2024

Related U.S. Application Data

(60) Provisional application No. 63/456,572, filed on Apr. 3, 2023.

(51) Int. Cl.
*G01V 1/38*     (2006.01)

(52) U.S. Cl.
CPC .......... *G01V 1/3861* (2013.01); *G01V 1/3808* (2013.01); *G01V 2210/121* (2013.01); *G01V 2210/1423* (2013.01)

(58) Field of Classification Search
CPC ............... G01V 1/3861; G01V 1/3808; G01V 2210/121; G01V 2210/1423; G01V 2210/1293; G01V 1/38
See application file for complete search history.

(56) References Cited

U.S. PATENT DOCUMENTS

| | | |
|---|---|---|
| 10,215,872 B2 | 2/2019 | Abma |
| 10,571,589 B2 | 2/2020 | Beitz et al. |

(Continued)

FOREIGN PATENT DOCUMENTS

| | | | | |
|---|---|---|---|---|
| EP | 3620828 A1 * | 3/2020 | ........... | G01V 1/3808 |
| GB | 2 602 433 A | 6/2022 | | |
| WO | WO-2019164405 A1 * | 8/2019 | ............. | G01V 1/003 |

OTHER PUBLICATIONS

Zu, et al., "A Periodically Varying Code for Improving Deblending of Simultaneous Sources in Marine Acquisition," Geophysics, vol. 81, Issue 3 (SEG 2016).

(Continued)

*Primary Examiner* — Daniel Pihulic

(57) ABSTRACT

A system and method controls impulsive source activations in a blended acquisition marine seismic survey. A component of the system generates a sequence of dither values deterministically and stores the sequence of dither values, or source activation indicators derived therefrom, in a non-transitory medium readable by a control system operable to execute shot points during the survey responsive to the values stored in the medium. According to some embodiments, generating the dither values comprises iteratively selecting from a fixed set of candidate dither values to produce a candidate sequence of dither values. The selecting is based on evaluating one or more quantitative measures of randomness and one or more quantitative measures of separation exhibited by at least a portion of the candidate sequence of dither values. Generated sequences improve deblending results by reducing coherence exhibited by the dither values in the sequences.

42 Claims, 16 Drawing Sheets

(56) References Cited

U.S. PATENT DOCUMENTS

| | | |
|---|---|---|
| 10,649,108 B2 | 5/2020 | Elboth et al. |
| 10,962,667 B2 | 3/2021 | Iranpour |
| 11,105,946 B2 | 8/2021 | Abma et al. |
| 11,536,863 B2 | 12/2022 | Boiero et al. |
| 11,662,491 B2 | 5/2023 | Wangensteen et al. |
| 2021/0349228 A1 | 11/2021 | Strand et al. |
| 2022/0299668 A1 | 9/2022 | Fu |
| 2024/0329269 A1* | 10/2024 | Bekara ................. G01V 1/3861 |

OTHER PUBLICATIONS

Campman, et al., "Sparse Seismic Wavefield Sampling," The Leading Edge, vol. 36, Issue 8 (SEG 2017).

Mansour, et al., "Randomized Marine Acquisition 'Without' Simultaneous Sourcing," The University of British Columbia Technical Report, TR-2011-04 (UBC 2012).

Rohnke, et al., "Simultaneous Source Separation Using an Annihilation Filter Approach," 78th EAGE Conference and Exhibition, vol. 2016, pp. 1-5 (EAGE 2016).

Wason, et al., "Time-Jittered Ocean Bottom Seismic Acquisition," SEG Technical Program Expanded Abstracts 2013 (SEG 2013).

\* cited by examiner

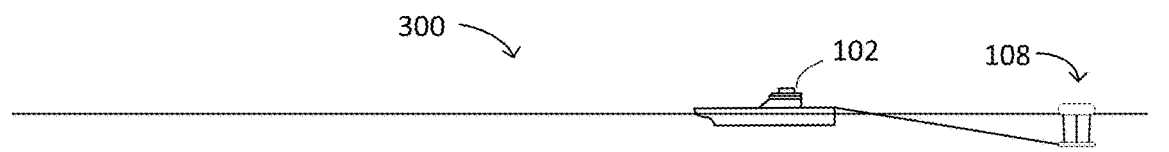
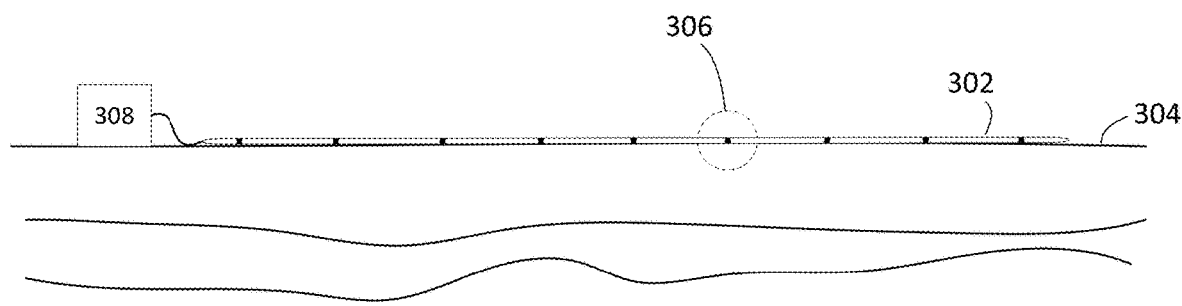
FIG. 3
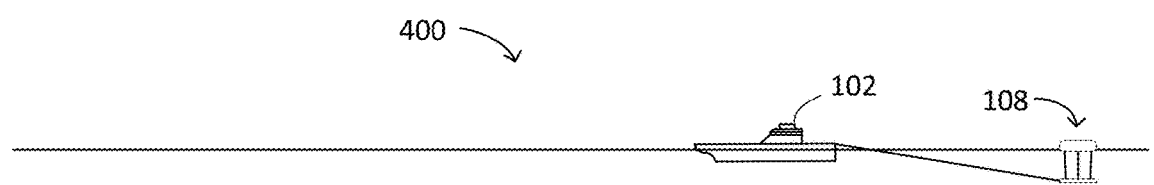
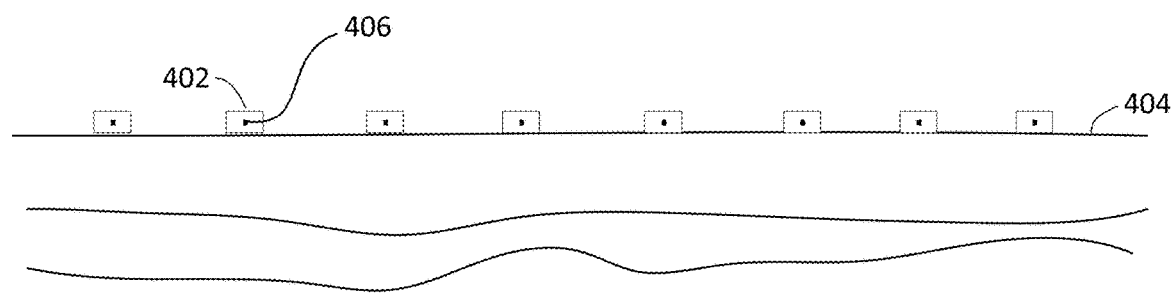
FIG. 4

|  | Global | Local |
|---|---|---|
| Randomness | Entropy | Decorrelation<br>Non-Periodicity |
| Separation | Variance | Minimum Distance<br>Average Distance<br>Inverse Duplication Rate |

FIG. 10

$$Entropy = -\sum_{i=1} p_i \log(p_i)$$  ~ 1100

FIG. 11

$$D_{var}(\Phi_L) = \sum_{i=1}^{L}(t_i - \bar{t})^2, \text{ where } \bar{t} = \frac{1}{L}\sum_{i=1}^{L} t_i$$  ~ 1200

FIG. 12

$$D_{dec}(\Phi_L) = 1 - \sum_{m=1}^{M} |R_h(m)| \Big/ MR_h(0)$$

FIG. 13

$$D_{fft}(\Phi_L) = \sum_{f=1}^{F_c} Q(f) \Big/ F_c$$

FIG. 14

$$D_{min}(\Phi_L) = \min_{(i,j), i \neq j} |t_i - t_j|$$

FIG. 15

$$D_{avg}(\Phi_L) = \frac{2}{L(L-1)} \sum_{i=1}^{L} \sum_{j=i+1}^{L} |t_i - t_j|$$

FIG. 16

$$D_{idr}(\Phi_L, dist) = \frac{2}{L(L-1)} \sum_{i=1}^{L} \sum_{j=i+1}^{L} I(|t_i - t_j| \geq dist)$$

$$I(X) = \begin{cases} 1 & \text{if } X = TRUE \\ 0 & \text{if } X = FALSE \end{cases}$$

FIG. 17

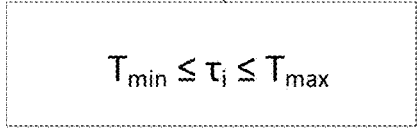
FIG. 18
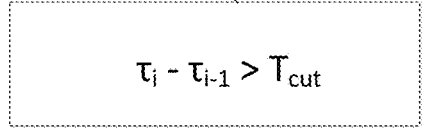
FIG. 19
For every window of L consecutive samples in
$\Omega_{src} = \{t_{src}, t_{src+N_{src}}, t_{src+2N_{src}}, \ldots, t_{src+kN_{src}}\}$, where $src = \{1, 2, \ldots, N_{src}\}$,
ensure that $\quad |\tau_i - \tau_j| > D_{th}, i \neq j$
FIG. 20

$$T_{src} = \{\tau_{src}, \tau_{src+N_{src}}, \tau_{src+2N_{src}}, \ldots, \tau_{src+kN_{src}}\}, \text{where } src = \{1, 2, \ldots, N_{src}\}$$

FIG. 21

$$\Omega_{src} = \{t_{src}, t_{src+N_{src}}, t_{src+2N_{src}}, \ldots, t_{src+kN_{src}}\}, \text{where } src = \{1, 2, \ldots, N_{src}\}$$

FIG. 22

$$\Theta(\Omega_{src}) = \alpha_1 Entropy(T_{src}) + \alpha_2 D_{dec}(\Omega_{src}, L) + \alpha_3 D_{fft}(\Omega_{src}, L) + \alpha_4 D_{avg}(\Omega_{src}, L) + \alpha_5 D_{min}(\Omega_{src}, L) + \alpha_6 D_{ldr}(\Omega_{src}, L) + \alpha_7 D_{var}(\Omega_{src}) +$$

FIG. 23

$$\{\hat{t}_1, \hat{t}_2, \ldots, \hat{t}_{N_{sp}}\} = \max_{\{\tau_1, \tau_2, \ldots, \tau_{N_{sp}}\}} \sum_{src=1}^{N_{src}} \Theta(\Omega_{src})$$

FIG. 24

SYSTEM AND METHOD FOR GENERATING SOURCE ACTIVATION TIMES OR LOCATIONS IN BLENDED MARINE SEISMIC ACQUISITIONS

CROSS REFERENCE TO RELATED APPLICATIONS

This application claims benefit to the filing date of U.S. Provisional Application 63/456,572, filed Apr. 3, 2023 (the "Provisional application"), the contents of which are hereby incorporated as if entirely set forth herein. In the event of a conflict between the meaning of a term as used herein and the same or a similar term as used in the Provisional Application, the meaning associated with this application shall control.

BACKGROUND

Seismic surveys are commonly performed to determine features and characteristics of subsurface earth strata and may be performed either onshore or offshore. A seismic survey performed offshore is referred to herein as a marine seismic survey.

In a marine seismic survey, one or more impulsive sources may be activated at intervals to produce acoustic energy waves, the reflections of which are detected by geophysical sensors. Signals from the sensors are recorded as the survey proceeds and are stored for later use in generating one or more images of subsurface features. Such images are used for a variety of purposes including, for example, locating hydrocarbon deposits or determining the suitability of a site for the installation of structures such as wind turbines.

Because of the expense associated with performing a marine seismic survey, a number of techniques have been developed to improve the efficiency of the data acquisition process. One such technique is variously referred to as "simultaneous shooting" or, synonymously, "blended acquisition." In a survey that employs blended acquisition, impulsive source activations occur closely enough in time with one another such that reflections attributable to an activation of one source are recorded simultaneously with reflections that are attributable to activations of one or more other sources. Thus, in a blended marine seismic acquisition, reflections from two or more sources are blended together in the recorded seismic data.

One benefit of blended acquisition is that, by reducing the time between source activations relative to that required in conventional surveys, the duration of the data acquisition process may be shortened. Another benefit of blended acquisition is that more shot points may be performed over a given survey area in the same amount of time relative to conventional surveys, thereby potentially increasing the quality of the survey data and the quality of the images produced therefrom.

Blended acquisition presents a challenge, however, in that "deblending" must be performed after the data acquisition process has been completed. In deblending, data processing techniques are employed to separate, from the blended recordings, energy that is attributable to each source individually from energy that is attributable to other sources used during the survey. The specific times at which the sources are activated during a blended acquisition can dramatically affect the quality of the deblending process, and thus the quality and usefulness of the recorded data.

Accordingly, a need exists for improved methods and systems for specifying source activation times (or, equivalently, source activation locations) in marine seismic surveys that employ blended acquisition.

BRIEF DESCRIPTION OF THE DRAWINGS

FIG. 3 is a side view of a representative example ocean bottom cable marine seismic survey configuration.

FIG. 4 is a side view of a representative example ocean bottom node marine seismic survey configuration.

FIG. 10 is a table illustrating an example set of global and local measures of randomness and separation that may be utilized by the system of FIG. 6 in some embodiments.

FIG. 11 is an equation illustrating how the global measure of randomness of FIG. 10 may be evaluated according to some embodiments.

FIG. 12 is an equation illustrating how the global measure of separation of FIG. 10 may be evaluated according to some embodiments.

FIGS. 13 and 14 are equations illustrating how respective ones of the local measures of randomness of FIG. 10 may be evaluated according to some embodiments.

FIGS. 15, 16, and 17 are equations illustrating how respective ones of the local measures of separation of FIG. 10 may be evaluated according to some embodiments.

FIGS. 18, 19, and 20 are expressions illustrating an example set of constraints that may be imposed on dither values according to some embodiments.

FIG. 21 is an equation describing a sequence of dither values $T_{src}$ for a given source src that may be used in a blended marine seismic acquisition according to some embodiments.

FIG. 22 is an equation describing a sequence of dither differences $\Omega_{src}$ for a given source src that may be used in a blended marine seismic acquisition according to some embodiments.

FIG. 23 is an equation describing an example per-source profit function that may be used to quantify randomness and separation in one or more sequences of dither values according to embodiments.

FIG. 24 is an equation describing an example method for selecting a per-shot set of dither values based on the per-source profit function of FIG. 23 according to some embodiments.

DETAILED DESCRIPTION

This disclosure describes multiple embodiments by way of example and illustration. It is intended that characteristics and features of all described embodiments may be combined in any manner consistent with the teachings, suggestions and objectives contained herein. Thus, phrases such as "in an embodiment," "in one embodiment," and the like, when used to describe embodiments in a particular context, are not intended to limit the described characteristics or features only to the embodiments appearing in that context.

The phrases "based on" or "based at least in part on" refer to one or more inputs that can be used directly or indirectly in making some determination or in performing some computation. Use of those phrases herein is not intended to foreclose using additional or other inputs in making the described determination or in performing the described computation. Rather, determinations or computations so described may be based either solely on the referenced inputs or on those inputs as well as others. The phrase "configured to" as used herein means that the referenced item, when operated, can perform the described function. In this sense an item can be "configured to" perform a function even when the item is not operating and is therefore not currently performing the function. Use of the phrase "configured to" herein does not necessarily mean that the described item has been modified in some way relative to a previous state. "Coupled" as used herein refers to a connection between items. Such a connection can be direct or can be indirect through connections with other intermediate items. Terms used herein such as "including," "comprising," and their variants, mean "including but not limited to." Articles of speech such as "a," "an," and "the" as used herein are intended to serve as singular as well as plural references except where the context clearly indicates otherwise.

Marine Seismic Surveys Generally

Figure 1:
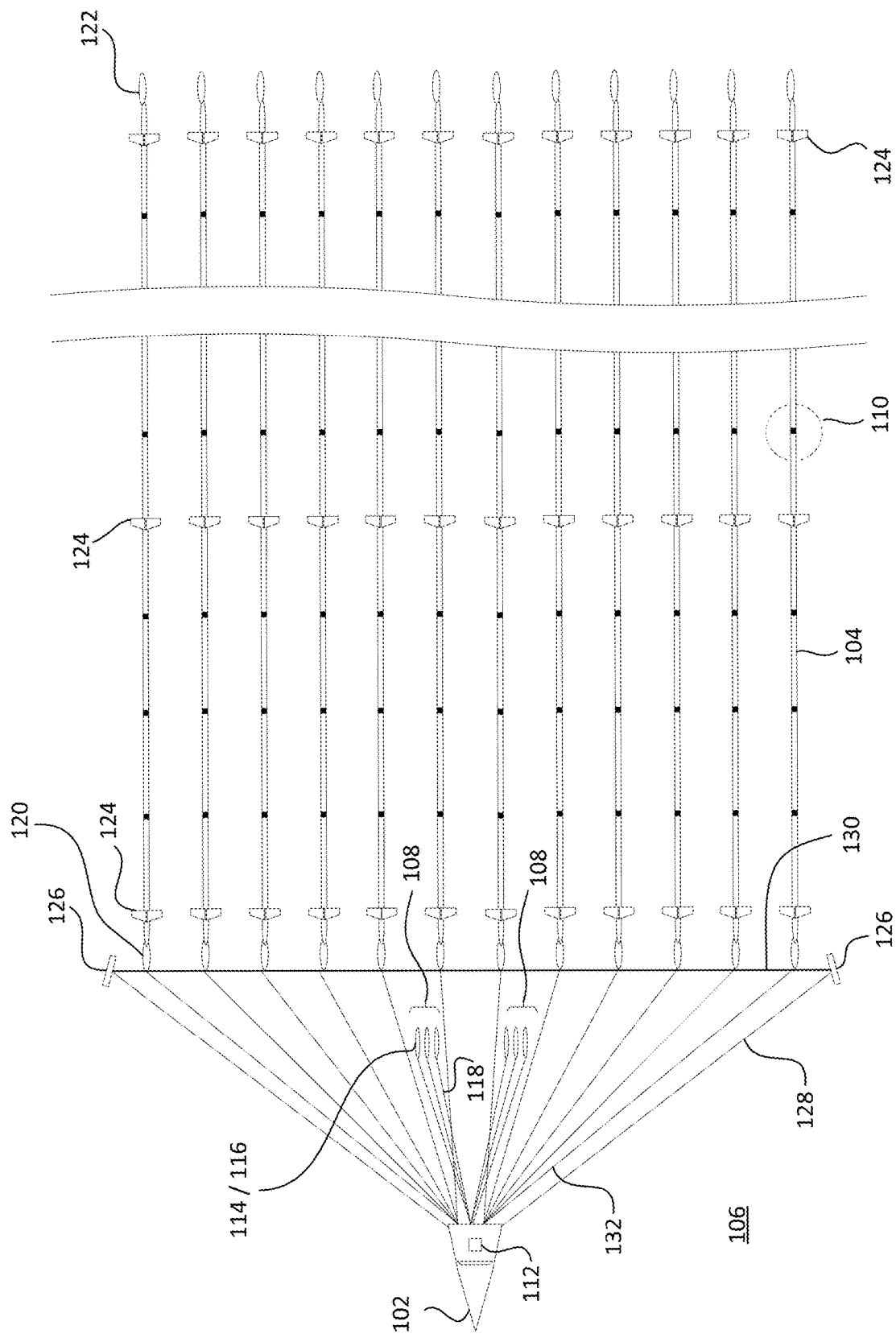
FIG. 1 is a top view of a representative example towed-streamer marine seismic survey configuration.
Figure 2:
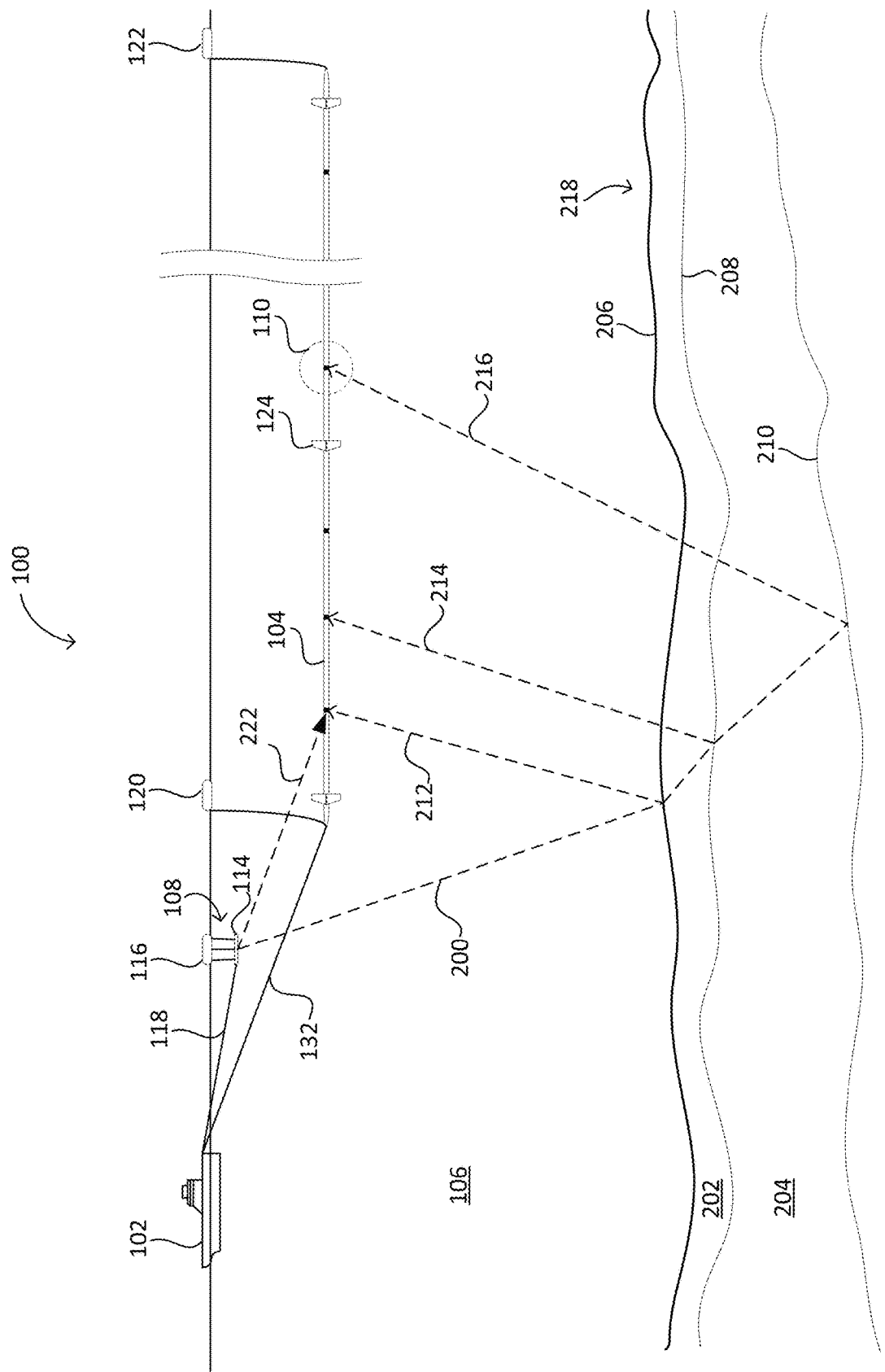
FIG. 2 is a side view of the towed-streamer marine seismic survey configuration of FIG. 1.

FIGS. 1 and 2 present top and side views, respectively, of an example towed-streamer marine seismic survey system that employs active seismic sources. Survey system 100 is representative of a variety of similar geophysical survey systems in which a vessel 102 tows an array of elongate sensor streamers 104 in a body of water 106 such as an ocean, a sea, a bay, or a large lake. Typically the vessel is equipped with at least one global positioning system ("GPS") unit so that its location during the survey may be known and recorded for later use. Vessel 102 is shown towing twelve streamers 104 in the illustrated example. In other embodiments, any number of streamers may be towed, from as few as one streamer to as many as twenty or more. The terms "streamer" and "cable" as used herein should be interpreted to include any type of seismic sensor cable, and the two terms may be used interchangeably below.

During a typical marine seismic survey, one or more active seismic sources 108 are activated to produce acoustic energy 200 that propagates in body of water 106. Energy 200 penetrates various layers of sediment and rock 202, 204 underlying body of water 106. As it does so, it encounters interfaces 206, 208, 210 between materials having different physical characteristics, including different acoustic impedances. At each such interface, a portion of energy 200 is reflected upward while another portion of the energy is refracted downward and continues toward the next lower interface, as shown. Reflected energy 212, 214, 216 is detected by sensors 110 disposed at intervals along the lengths of streamers 104, along with a so-called direct wavefield that reaches the sensors via a path, such as path 222, that travels directly from the active sources 108 to the location of the sensors. In FIGS. 1 and 2, sensors 110 are indicated as black squares inside each of streamers 104. Sensors 110 produce signals corresponding to the reflected energy. These signals are collected and recorded by control equipment 112 located onboard vessel 102. The recorded signals may be processed and analyzed onboard vessel 102 and/or at one or more onshore data centers to produce images of structures within subsurface 218. These images can be useful, for example, in identifying possible locations of hydrocarbon reservoirs within subsurface 218 or in identifying favorable locations within subsurface 218 for the installation of new structures such as foundations for wind turbines.

Any number of active sources 108 may be used in a marine seismic survey. In the illustrated example, vessel 102 is shown towing two such sources. In other systems, different numbers of sources may be used, and the sources may be towed by other vessels, which vessels may or may not tow additional streamer arrays. Typically, an active source 108 includes one or more source subarrays 114, and each subarray 114 includes one or more acoustic emitters such as air guns, sparkers, or marine vibrators. Each subarray 114 may be suspended at a desired depth from a subarray float 116. Compressed air as well as electrical power and control signals may be communicated to each subarray via source umbilical cables 118. Data may be collected, also via source umbilical cables 118, from various sensors located on subarrays 114 and/or floats 116, such as acoustic transceivers and GPS units. Acoustic transceivers and GPS units so disposed help to accurately determine the positions of each subarray 114 during a survey. In some cases, subarrays 114 may be equipped with steering devices to better control their positions during the survey.

In the context of surveys related to the prospection of hydrocarbon reservoirs, streamers 104 are often very long—on the order of 5 to 10 kilometers or longer—so usually are constructed by coupling numerous shorter streamer sections together. For site surveys such as those related to the installation of wind turbines, the streamers are typically much shorter-on the order of 100 to 500 meters, depending on the water depth. The target depth range in the latter types of surveys is often between 0 and 200 meters, whereas in hydrocarbon reservoir surveys the target depth is typically much deeper. In either case, each streamer 104 may be attached to a dilt float 120 at its proximal end (the end nearest vessel 102) and to a tail buoy 122 at its distal end (the end farthest from vessel 102). Dilt floats 120 and tail buoys 122 may be equipped with GPS units as well, to help determine the positions of each streamer 104 relative to an absolute frame of reference such as the earth. Each streamer 104 may in turn be equipped with acoustic transceivers and/or compass units to help determine their positions between GPS units and/or relative to one another. In many survey systems 100, streamers 104 include steering devices 124 attached at intervals, such as every 300 meters. Steering devices 124 typically provide one or more control surfaces to enable moving the streamer to a desired depth, or to a desired lateral position, or both. Paravanes 126 are shown coupled to vessel 102 via tow ropes 128. As the vessel tows the equipment, paravanes 126 provide opposing lateral forces that straighten a spreader rope 130, to which each of streamers 104 is attached at its proximal end. Spreader rope 130 helps to establish a desired crossline spacing between the proximal ends of the streamers. Power, control, and data communication pathways are housed within lead-in cables 132, which couple the sensors and control devices in each of streamers 104 to the control equipment 112 onboard vessel 102.

Collectively, the array of streamers 104 forms a sensor surface at which acoustic energy is received for recording by control equipment 112. In many instances, it is desirable for the streamers to be maintained in a straight and parallel configuration to provide a sensor surface that is generally flat, horizontal, and uniform. In other instances, an inclined and/or fan shaped receiving surface may be desired and may be implemented using control devices on the streamers such as those just described. Other array geometries may be implemented as well. Prevailing conditions in body of water 106 may cause the depths and lateral positions of streamers 104 to vary at times. In various embodiments, streamers 104 need not all have the same length and need not all be towed at the same depth or with the same depth profile.

Sensors 110 within each streamer 104 may include one or more different sensor types such as pressure sensors (e.g., hydrophones) and/or motion sensors. Examples of motion sensors include velocity sensors (e.g., geophones) and acceleration sensors (e.g., accelerometers) such as micro-electro-mechanical system ("MEMS") devices. In general, pressure sensors provide a magnitude-only, or scalar, measurement. This is because pressure is not associated with a direction and is, therefore, a scalar quantity. Motion sensors such as velocity sensors and acceleration sensors, however, each provide a vector measurement that includes both a magnitude and, at least implicitly, a direction, as velocity and acceleration are both vector quantities. Velocity sensors and acceleration sensors each may be referred to herein as "motion sensors."

FIG. 3 illustrates an example ocean bottom cable survey system 300, in which a vessel 102 tows one or more sources 108 over an installation of one or more ocean bottom cables 302, each of which is disposed on a water bottom 304. Each cable 302 may include one or more sensors or sensor groups 306 disposed along its length, generally as shown. In turn, each of the cables may be coupled to a manifold 308 in which signals from the sensors may be aggregated and either stored or transmitted to a collection point, or both.

FIG. 4 illustrates an example ocean bottom node survey system 400, in which a vessel 102 tows one or more sources 108 over an installation of one or more ocean bottom nodes 402, each of which is disposed on a water bottom 404. Each node 402 may include one or more sensors or sensor groups 406 as shown. Signals generated by the sensors or sensor groups may be collected in the nodes for later retrieval, or may be transmitted to a collection point, or both.

Techniques to be described herein may be employed in the context of any of the above or similar types of marine seismic surveys, as well as in other types of marine seismic surveys.

Example Blended Acquisition with Dithering

Figure 5:
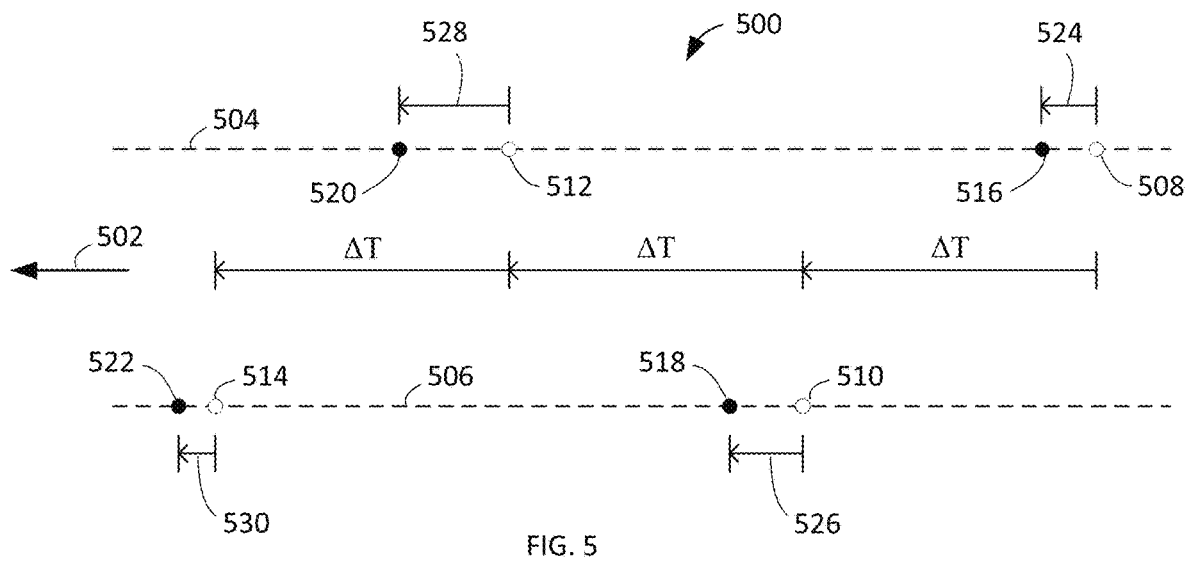
FIG. 5 is a top view schematically illustrating example nominal shot points and dither values.

FIG. 5 is a top view schematically illustrating, by way of example, several shot points in a blended marine seismic acquisition 500 that employs two sources. While the example survey shown employs two sources, techniques described herein may be applied with equal benefit in surveys that employ any number of sources and that employ any number of towing vessels. Moreover, sources in embodiments may be deployed in spatial arrangements that are different from the one shown in FIG. 5 and need not all be towed in the same direction or at the same speed.

In example acquisition 500, a vessel tows two sources in an inline tow direction 502 along respective shot lines 504, 506. The vessel follows a sail line indicated by a survey pre-plot. The survey pre-plot further indicates a number of nominal shot points 508, 510, 512, 514. The nominal shot points in each shot line are spaced apart from one another in the inline direction by an interval $\Delta T = shot\_dist/Vspeed$, as shown. Dither values are stored in a dither table accessible by a control system onboard the vessel. For a given nominal shot point, the control system determines an actual shot point or firing time by retrieving a corresponding dither value from the dither table and adding the dither value to the time or location specified for the nominal shot point. The result is a sequence of actual shot points 516, 518, 520, 522, each of which differs from an associated nominal shot point by a respective dither value 524, 526, 528, 530, as shown.

In a blended acquisition, the actual shot points occur closely enough in time with one another that geophysical sensors (which are typically located either in towed streamers, ocean bottom cables, nodes, or in some combination of these) simultaneously record reflections that are attributable to more than one shot. The reflection energy in the blended recording is separated by performing a deblending process accordance to any of a variety of known techniques. Most such techniques involve time-aligning recorded traces according to a known activation time for a given target shot, and adding the time-aligned traces in a process known as stacking. Ideally, the result of the time-alignment and stacking steps is that the energy attributable to the target shot becomes coherent, such that stacking the traces constructively reinforces the desired signal from the target shot, whereas the energy that is attributable to other shots becomes incoherent and appears as random noise in the stacked traces. Once the time-alignment and stacking have been performed, the unwanted energy can be removed by applying known techniques such as noise filtering.

Improved Deblending Through Deterministic Reduction of Coherence in Dither Value Sequences As was mentioned above, the specific times at which the sources are activated during a blended acquisition can dramatically affect the quality of the deblending process, and thus the quality and usefulness of the recorded data. For this reason, significant efforts have been expended in the industry to produce dither value sequences that can aid the deblending process.

To date, prior methods for building dither value sequences have relied on randomly generating a proposed next dither value for a sequence and either accepting or rejecting the proposed next value based on whether the value meets one or more constraints. The constraints used in such methods are typically based on the difference between a proposed dither value and an immediately previous dither value in the relevant sequence. Specifically, the constraints have simply measured whether this difference exceeds some minimum acceptable threshold value.

Unfortunately, dither value sequences produced according to such methods have yielded less than optimal results during the deblending process. Despite their reliance on random number generators while building dither sequences, the prior methods have produced dither sequences that nevertheless exhibit coherence among the dither values in the sequence. The residual coherence among the dither values reduces the effectiveness of the deblending process such that unwanted energy attributable to other shots remains present as interfering energy in the deblended record for a single target shot.

Embodiments to be described herein are able to better reduce the coherence exhibited by a sequence of dither values used in a blended acquisition, and thereby to improve the results of deblending the recorded data. Embodiments do so by generating one or more dither value sequences deterministically rather than randomly, and by quantifying the desirability of adding a new dither value to a sequence by quantitatively measuring both the randomness of the resulting sequence and the degree of separation among the samples in the resulting sequence. In some embodiments, both the randomness and the separation in the sequence are quantified by using global measures that encompass all of the samples in the sequence, as well as by using local measures that encompass only one or more proper subsets of samples in the sequence. In some embodiments, the determination as to which dither values to include in a given dither value sequence may be driven by evaluating a profit function that is formulated based on one or more of the aforementioned measures. While some embodiments may yet impose one or more constraints on dither values to avoid adding new values to a dither sequence that would violate predefined limits, doing so in conjunction with the above-described techniques does not diminish the improved incoherence among dither values in sequences that such embodiments are able to generate.

Building dither sequences deterministically by quantifying the randomness and the sample separation in the sequence, and in some embodiments doing so by using global as well as local measures of randomness and separation, yields superior results relative to the prior art techniques that rely only on random number generators and constraints. This is because the dither value sequences produced by embodiments exhibit reduced coherence relative to those produced by the prior art methods. The reduced coherence in the dither value sequence, in turn, yields better results during the deblending process such that reflection energy attributable to each of the individual sources used in a survey may be better isolated from reflection energy attributable to the other sources.

Terminology

The following terms as used herein will have the following meanings:

Shot: An activation of one impulsive source during a marine seismic survey.

Survey Segment: A portion of a marine seismic survey during which multiple shots occur. A survey segment may comprise, for example, one sail line, multiple sail lines, or all of the sail lines in a survey.

Shot Point: A location at which a shot occurs during a marine seismic survey.

Source Vessel: A vessel towing a source. Unless expressly indicated otherwise, any source vessel may also tow streamers.

Vspeed: The speed of a source vessel.

Inline Direction: For a towed source, the inline direction corresponds to the direction in which the source is being towed at a given point in time during a marine seismic survey. Depending on the survey design, an inline direction may be a straight line or may include one or more curves. For surveys in which a source vessel follows a curved sail path, the inline direction for a source towed by the source vessel corresponds to a direction that follows the curved path of the source vessel.

Nominal Shot Point: A scheduled location for a given shot, according to a survey pre-plot, without any dithering applied to the firing time or to the firing location of the shot. Nominal shot points are usually spaced apart at regular intervals along a tow direction (along an inline direction).

Shot to Shot Distance (shot_dist): The inline distance between two consecutive nominal shot points in a survey pre-plot.

Nominal Firing Time: A scheduled firing time for a given source, according to a survey pre-plot, without any dithering applied.

Firing Time (T): A time at which a shot occurs during a marine seismic survey. A firing time corresponds to an actual firing time for a source. A firing time is synonymous with a shot time. In a survey that employs dithering, the firing time for a given shot corresponds to a nominal firing time for the shot plus a dither time that may be associated with the shot. $T_n$ denotes the firing time for an $n^{th}$ shot of a survey or survey segment.

$\Delta T$: The time required for a source vessel to travel the shot to shot distance. $\Delta T$ is a constraint that may be set by survey designers. $\Delta T = \text{shot\_dist}/V\text{speed}$.

Dither: A variation that can be applied to a nominal firing time or, equivalently, to a nominal shot point, to produce a resultant firing time or shot point that is different from the nominal firing time or the nominal shot point. A dither may correspond to a dither time or, equivalently, to a dither distance.

Dither Value: The amount of a dither to be applied to a nominal firing time or to a nominal shot point. A dither value may be specified in units of time or in units of distance and may be a positive or a negative value.

Dither Time ($\tau$): A time variation that can be added to a nominal firing time to produce an actual firing time that is different from the nominal firing time. The variable $\tau_n$ denotes a dither time corresponding to the $n^{th}$ shot of a survey.

Dither Times versus Dither Distances: Note that dither times and dither distances are related by the speed of the vessel that tows the sources. Thus, a dither distance is generally equivalent to a dither time after taking the speed of the towing vessel into account. While several illustrative examples and embodiments will be discussed below in terms of dither times, persons having skill in the art and having reference to this disclosure will readily appreciate that equivalent embodiments may be implemented in terms of dither distances. Except where the context dictates otherwise, the terms used in the claims below are intended to include both classes of embodiments and should be interpreted accordingly.

Maximum Dither Time ($\tau_{max}$) and Minimum Dither Time ($\tau_{min}$): $\tau_{max}$ corresponds to the maximum of all dither times in a survey segment. $\tau_{min}$ corresponds to the minimum of all dither times in a survey segment. These are constraints that may be set by survey designers. For any shot in a survey segment, the corresponding dither time must be greater than or equal to the minimum dither time for the survey segment and less than or equal to the maximum dither time for the survey segment: $\tau_{min} \leq \tau_n \leq \tau_{max}$. Usually, $\tau_{max} << \Delta T$. Typical values for $\tau_{max}$ are between 500 msec and 1000 msec.

Dither Difference ($t_n$): The difference between the dither value for a shot and the dither value for the immediately preceding shot in a survey segment, defined as $t_n = \tau_{n+1} - \tau_n$. Note that $t_n$ is negative when dither value $\tau_{n+1}$ is smaller than dither value $\tau_n$.

Clean Record Length (CRL): The length of time between two consecutive shots in a survey segment. A clean record length is synonymous with a shot interval between two consecutive shots. For any two consecutive shots $S_{n+1}$ and $S_n$, CRL=$\Delta T + t_n$. Note that, when $t_n$ is negative for two consecutive shots, the CRL for the two shots will be less than $\Delta T$.

Minimum Clean Record Length ($CRL_{min}$): The minimum length of time that must elapse between any two consecutive shots in a survey segment. This is a constrain that may be set by survey designers.

$T_{cut}$: The minimum acceptable $t_n$ over a survey segment, i.e., $t_n > T_{cut}$. This is a constraint that may be set by survey designers. $T_{cut}$ may be, and usually is, a negative number. Note that $CRL_{min} = \Delta T + T_{cut}$. Thus, $T_{cut} = CRL_{min} - \Delta T$.

Dither Table: A specification of dithers to be applied by a source controller to the respective nominal firing times or the nominal shot points in a survey segment. Equivalently, a dither table may comprise a specification of actual firing times or actual shot points to be executed by a source controller during a survey segment, where dithers have been incorporated into the specified firing times or shot points.

Source Activation Pattern: A pattern in which sources are activated during a multi-source survey or survey segment. For example, in a dual source survey that employs sources 1 and 2, an alternating source activation pattern could be: 1, 2, 1, 2, etc. In a triple source survey that employs sources 1, 2, and 3, a repeating cyclic source activation pattern could be: 1, 2, 3, 1, 2, 3, etc. A wide variety of source activation patterns are possible. A source activation pattern is a parameter that may be set by survey designers.

Per-Shot Dither Sequence and Per-Source Dither Sequences: A per-shot dither sequence specifies dithers to be applied to all sequential shots in a survey segment without regard to which sources execute the respective shots. A per-source dither sequence specifies only the dithers that are to be applied to sequential shots executed by a given source during a survey segment. A per-shot dither sequence is equivalent to a corresponding set of per-source dither sequences for the same survey segment, where the equivalence is determined by the source activation pattern to be used during the survey segment. In the latter sense, one type of dither sequence is merely a sorted version of the other. In general, a per-shot dither value sequence for a survey segment may have the form $$T = \{\tau_1, \tau_2, \tau_3, \ldots \tau_n\},$$

where n is the number of shots in the survey segment. Similarly, a per-source dither value sequence for a survey segment that employs a repeating cyclic source activation pattern, such as the one described above, may have the form $$T_{src} = \{\tau_{src}, \tau_{src+N_{src}}, \tau_{src+2N_{src}}, \ldots, \tau_{src+kN_{src}}\},$$

where src is a source number chosen from the set $\{1, 2, \ldots, N_{src}\}$, where $N_{src}$ is the number of sources used in the cyclic pattern, and where each of the indices (e.g., src, src+$N_{src}$, and so on) corresponds to one of the indices in the equivalent per-shot dither sequence. By way of further example, if three sources are to be used in a cyclic pattern to implement the above per-shot dither sequence, then an equivalent set of per-source dither sequences may be designated as follows:

$$T_{src1} = \{\tau_1, \tau_4, \tau_7, \ldots, \tau_{3k+1}, \ldots\}$$

$$T_{src2} = \{\tau_2, \tau_5, \tau_8, \ldots, \tau_{3k+2}, \ldots\}$$

$$T_{src3} = \{\tau_3, \tau_6, \tau_9, \ldots, \tau_{3k+3}, \ldots\}$$

Source Activation Indicator: A source activation indicator corresponds to any number, code, or other value that a source controller may use, potentially in conjunction with other inputs such as a survey pre-plot, to determine a time or location at which to activate a source during a marine seismic survey. By way of example and not limitation, a shot activation indicator may correspond to a dither value in any of the types of sequences described herein, or to a shot location or firing time that has been derived from a pre-plotted nominal shot point and an associated dither value. Other types of source activation indicators are also possible.

Example Embodiments

Several example embodiments will now be described by way of example and not by way of limitation.

Figure 6:
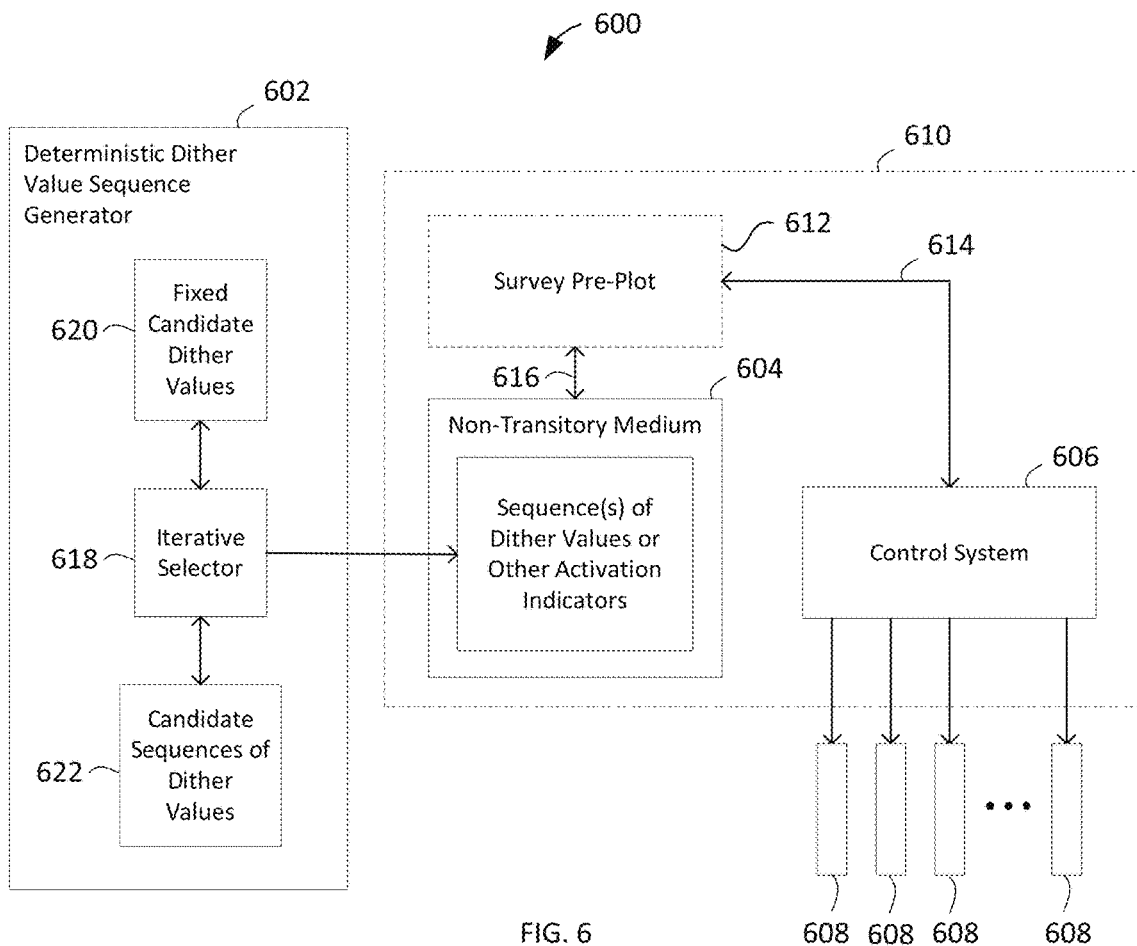
FIG. 6 is a block diagram schematically illustrating a system according to some embodiments for controlling impulsive source activations in a marine seismic survey.

FIG. 6 is a schematic diagram illustrating an example system 600 according to some embodiments for controlling impulsive source activations in a marine seismic survey. The system includes a deterministic dither value sequence generator 602. Sequence generator 602 is configured to generate a final sequence of dither values deterministically and to store the final sequence of dither values, or a sequence of source activation indicators derived therefrom, in a non-transitory medium 604 that is readable by a control system 606. In embodiments that employ dither values, such a final sequence of dither values may comprise a per-shot dither value sequence or a set of per-source dither value sequences, or any combination of the two. The control system is operable to activate one or more impulsive marine seismic sources 608 based on the dither values or on the source activation indicators stored in medium 604 and retrieved directly or indirectly therefrom. As indicated by dashed lines 610, 612 and by arrows 614, 616, in some embodiments the control system may have access to a survey pre-plot separately from the final sequence of dither values. In other embodiments, final dithered shot points or firing times may be precomputed based on a combination of pre-plotted nominal shot points and dither values, and the final dithered shot points or firing times may be stored in non-transitory medium 604 and may be used to represent the final sequence of dither values. In the latter embodiments, the control system need not necessarily have access to a pre-plot separately in order to control sources 608 in accordance with the final sequence of dither values. In yet other embodiments, the pre-plot may be stored in the non-transitory medium along with the final sequence of dither values. Other variations are also possible.

Dither value sequence generator 602 includes an iterative selector 618. The iterative selector is configured to generate the final sequence of dither values by iteratively selecting from a fixed set of candidate dither values 620 to produce one or more candidate sequences of dither values 622. One or more of the candidate sequences may increase in length with each iteration of the selector. Once a candidate sequence of adequate length has been accumulated and has been chosen by the iterative selector for use in a survey, the chosen candidate sequence may be generated by the selector and may be stored in the non-transitory medium to represent the final sequence of dither values to be used in controlling sources 608.

In some embodiments, sequence generator 602 may be located onboard a vessel used in the survey. In other embodiments, the sequence generator may be located elsewhere, such as in an onshore datacenter. Moreover, in some embodiments one or more components of the sequence generator may be implemented in hardware using special-purpose devices such as application-specific integrated circuits ("ASICS"). In the same or other embodiments, one or more of the components may be implemented in software that executes on a general-purpose computing device such as the computer system illustrated by way of example in FIG. 7.

Figure 7:
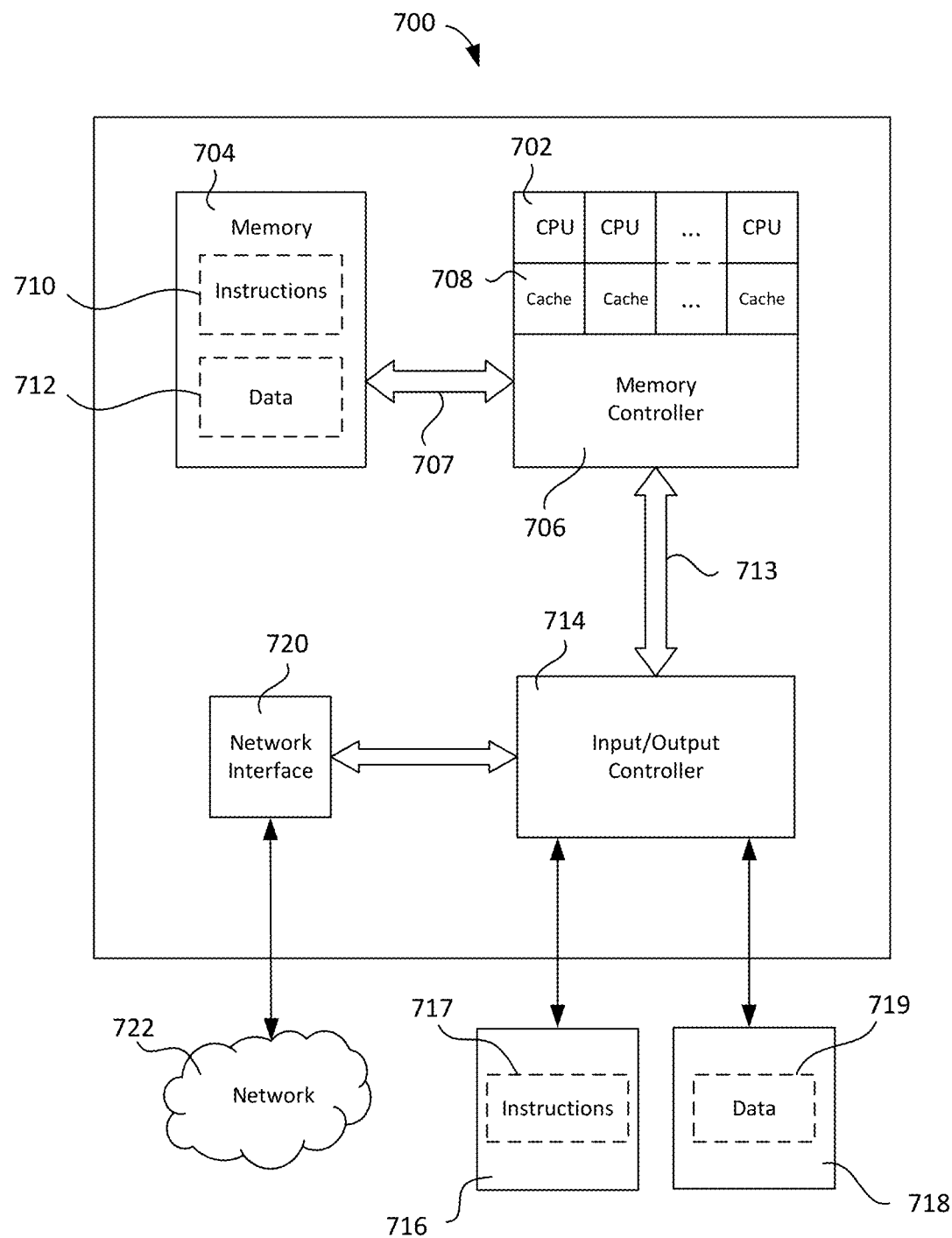
FIG. 7 is a block diagram schematically illustrating an example computer system suitable for use in implementing one or more of the components of the system of FIG. 6 according to some embodiments.

Referring now to FIG. 7, a computer system 700 may be used to perform any of the methods described herein. A computer system such as computer system 700 may also be used to produce or to execute a computer-readable survey plan or dither table according to any of the embodiments described herein.

Computer system 700 includes one or more central processor unit ("CPU") cores 702 coupled to a system memory 704 by a high-speed memory controller 706 and an associated high-speed memory bus 707. System memory 704 typically comprises a large array of random-access memory locations, often housed in multiple dynamic random-access memory ("DRAM") devices, which in turn may be housed in one or more dual inline memory module ("DIMM") packages. Each CPU core 702 is associated with one or more levels of high-speed cache memory 708, as shown. Each core 702 can execute computer-readable instructions 710 stored in system memory 704, and can thereby perform operations on data 712, also stored in system memory 704.

Memory controller 706 is coupled, via input/output bus 713, to one or more input/output controllers such as input/output controller 714. Input/output controller 714 is in turn coupled to one or more non-transitory computer readable media such as computer-readable medium 716 and computer-readable medium 718. Non-limiting examples of such computer-readable media include so called solid-state disks ("SSDs"), spinning media magnetic disks, optical disks, flash drives, magnetic tape, and the like. Media 716, 718 may be permanently attached to computer system 700 or may be removable and portable. In the example shown, medium 716 has instructions 717 (software) stored therein, while medium 718 has data 719 stored therein. Operating system software executing on computer system 700 may be employed to enable a variety of functions, including transfer of instructions 710, 717 and data 712, 719 back and forth between media 716, 718 and system memory 704.

Computer system 700 may represent a single, stand-alone computer workstation that is coupled to input/output devices such as a keyboard, pointing device and display. It may also represent one node in a larger, multi-node or multi-computer system such as a cluster, in which case access to its computing capabilities may be provided by software that interacts with and/or controls the cluster. Nodes in such a cluster may be collocated in a single data center or may be distributed across multiple locations or data centers in distinct geographic regions. Further still, computer system 700 may represent an access point from which such a cluster or multi-computer system may be accessed and/or controlled. Any of these or their components or variants may be referred to herein as "computing apparatus" or a "computing device."

In example embodiments, data 719 may correspond to sensor measurements or other data recorded during a marine geophysical survey, or may correspond to a survey plan or dither table corresponding to any of those described herein. Instructions 717 may correspond to algorithms for performing any of the methods described herein, or for producing a computer-readable survey plan or dither table in accordance with one or more of such methods. In such embodiments, instructions 717, when executed by one or more computing devices such as one or more of CPU cores 702, cause the computing device to perform operations described herein on the data, producing results that may be stored in one or more non-transitory computer-readable media such as medium 718. In such embodiments, medium 718 constitutes a geophysical data product that is manufactured by using the computing device (and, in some cases, by using vessels, sources, and sensors) to perform methods described herein and by storing the results in the medium. Geophysical data product 718 may be stored locally or may be transported to other locations where further processing and analysis of its contents may be performed. If desired, a computer system such as computer system 700 may be employed to transmit the geophysical data product electronically to other locations via a network interface 720 and a network 722 (e.g. the Internet). Upon receipt of the transmission, another geophysical data product may be manufactured at the receiving location by storing contents of the transmission, or processed versions thereof, in another non-transitory computer readable medium. Similarly, geophysical data product 718 may be manufactured by using a local computer system 700 to access one or more remotely-located computing devices in order to execute instructions 717 remotely, and then to store results from the computations on a medium 718 that is attached either to the local computer or to one of the remote computers. The word "medium" as used herein should be construed to include one or more of such media.

Figure 8:
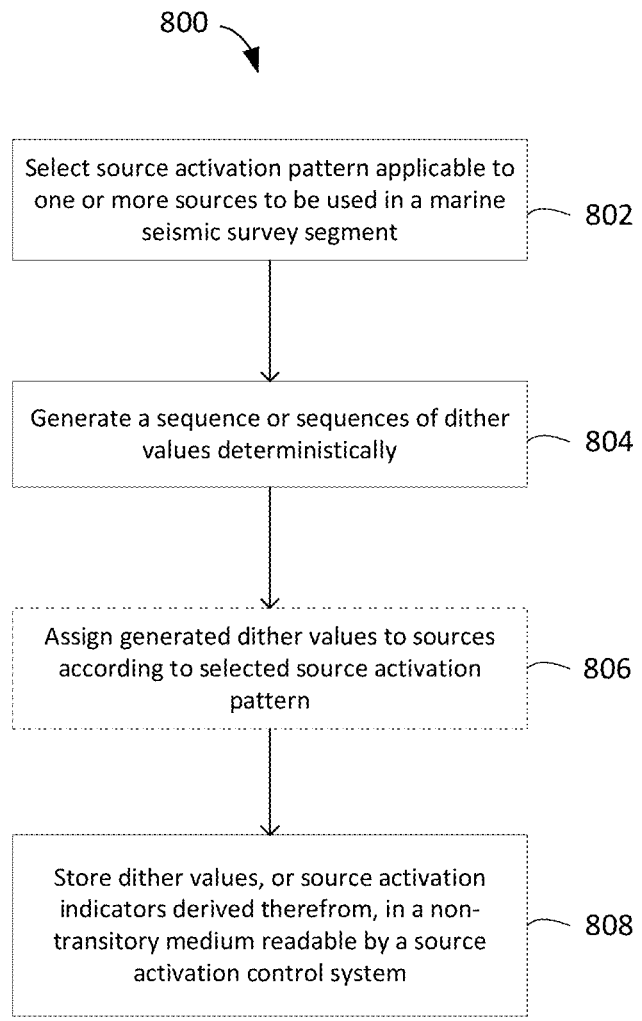
FIG. 8 is a flow diagram illustrating an example context in which the system of FIG. 6 may be employed according to some embodiments.

FIG. 8 is a flow diagram illustrating an example context 800 in which the system of FIG. 6 may be employed. In step 802, a source activation pattern is selected for one or more sources to be used in a marine seismic survey segment. The selection of the source activation pattern may be left to the survey designers or may be selected by other means.

In step 804 system 600 may be used to generate one or more sequences of dither values deterministically, in any of several techniques to be described herein. The sequences may be generated in any form, including but not limited to a per-shot dither sequence, a set of per-source dither sequences, or other source activation indicators derived therefrom.

Depending on the form in which the one or more sequences are generated in step 804, step 806 may be performed, if desired, to convert the generated sequence into an equivalent set of per-source sequences, in which case the dither values from the generated sequence may be assigned to the sources that will be used in the survey segment in accordance with the source activation pattern selected in step 802. For example, in a survey that will employ three sources in a repeating cyclic source activation pattern such as the one described above, the first dither value in the generated sequence may be assigned to source 1, the second dither value to source 2, the third dither value to source 3, the fourth dither value to source 1, and so on. In embodiments in which step 806 is performed, the assignment of dither values to sources may be performed by the selective iterator, by the control system, or by other suitable means.

In step 808 one or more sequences of dither values or other source activation indicators are stored in a non-transitory medium, such as medium 604, which medium is readable by a source activation control system, such as source control system 606. Step 808 may vary in embodiments. In some embodiments, per-source dither value sequences may be generated before a survey is performed and may be stored in medium 604 in lieu of or in addition to the sequence that was generated in step 804. In other embodiments, a per-shot sequence may be generated in step 804 and may be stored in medium 604, and the control system may determine per-source activations in real time by using the per-shot sequence from step 804 as an input along with knowledge of the source activation pattern to be used during the survey. Other variations are also possible. As used herein, the term "sequence" refers equally to a per-shot sequence that has not yet been assigned to individual sources, or to a set of per-source sequences, or to both.

Figure 9:
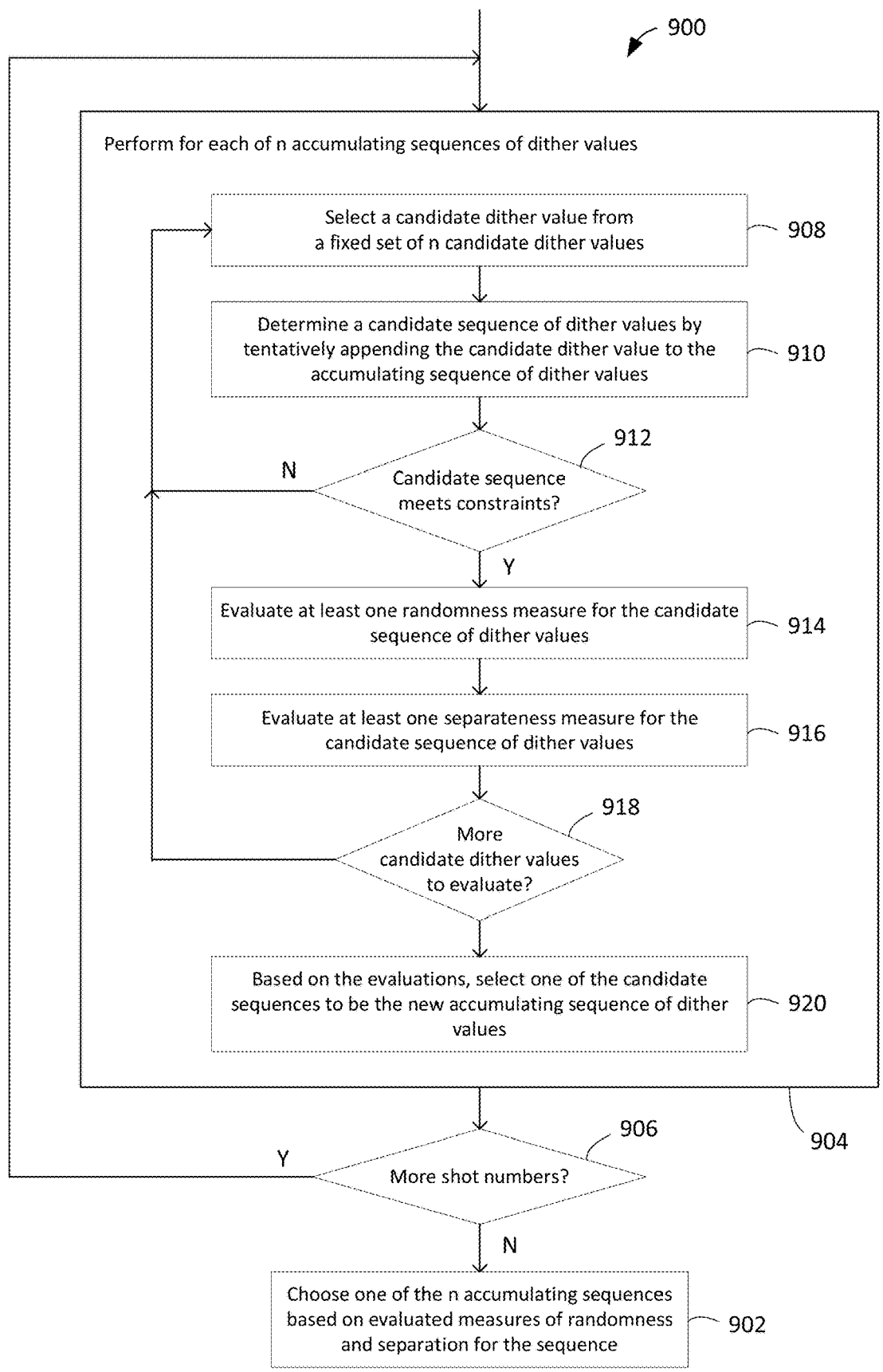
FIG. 9 is a flow diagram illustrating example functionality of the system of FIG. 6 according to some embodiments.

FIG. 9 is a flow diagram illustrating an example method 900 for deterministically generating a sequence of dither values. Method 900 comprises one of several possible ways to implement step 804 as described above. Given a fixed set of n candidate dither values and a desired number of shot numbers m, method 900 describes a process in which n candidate dither value sequences are accumulated, each sequence potentially comprising m dither values. (In some embodiments, the first and last of the m dither values in each sequence may be treated as special cases, as will be further described below.) The n candidate dither values used in the method may correspond, for example, to those in set 620 of system 600. At the end of the method, at step 902, one of the n accumulated candidate dither value sequences is selected for use in a survey segment. The selection is preformed based on evaluated measures of randomness and separation for the selected sequence. Examples of such measures will be described further below.

As decision step 906 indicates, the process represented by box 904 is repeated for each of at least m−1 shot numbers. Within box 904 is another loop that, for a given shot number, is repeated for all of the n accumulating dither value sequences. During a single iteration of the loop inside box 904, one dither value is added to one of the n accumulating sequences. A total of n iterations of the loop inside box 904 are performed before decision step 906 proceeds to the next shot number. In this way, all of n accumulating sequences are developed in tandem, shot number by shot number. At step 902, after m−1 dither values have been added to each of the n accumulating sequences, a final dither value is considered for addition to each sequence, and one resulting sequence is selected from among the n accumulated candidates. The final sequence is selected based on evaluated measures of randomness and separation for the sequence.

The process inside box 904 will now be considered in further detail. As was previously mentioned, the process proceeds once for each n accumulating sequences of dither values. In step 908, a first candidate dither value is selected from a fixed set of candidate dither values. As an arbitrary but illustrative example, a fixed set of 10 candidate dither values might comprise a set of dither times from 0 msec to 900 msec in 100 msec increments. Many other such sets are possible. Given such a set, the 0 msec dither time may be chosen in a first iteration of process 904, and the 100 msec dither time may be chosen in a second iteration, and so on. In step 910, a candidate sequence of dither values is determined by tentatively appending the selected candidate dither value to the current accumulating sequence of dither values.

Note that, in embodiments that impose constraints on dither values or on dither value differences, such constraints may be evaluated at step 912 based on the tentatively selected candidate dither value. If the constraints are satisfied, the process may continue at step 914. But if the constraints are not satisfied, then the selected candidate dither value may be disregarded for the current iteration (e.g., it may be removed from the accumulating sequence of dither values to which it was tentatively appended in step 910), and another candidate dither value may be chosen for consideration at step 908.

At step 914, at least one quantitative randomness measure is evaluated for the candidate sequence of dither values that was determined in step 910. At step 916, at least one quantitative separateness measure is evaluated for the candidate sequence of dither values. Examples of such quantitative measures will be further described below. In some embodiments, a quantitative profit function (also to be further described below) may be evaluated based on the randomness measures and the separateness measures.

The sequence of steps 908-916 is repeated for each of the n candidate dither values in the fixed set of n candidate dither values, such that all possible choices of candidate dither values have been considered for appending to the current accumulating sequence. Then, at step 920, one of the candidate dither values that was tentatively selected and evaluated in steps 908-918 is chosen as the one to be appended to the current accumulating sequence. The selection made in step 920 is based on the evaluations made in steps 914 and 916 (or, in embodiments that employ a profit function, on the values of the profit function determined for the candidate dither values considered).

Global Measures and Local Measures

Referring now to FIG. 10, in some embodiments the at least one randomness measure evaluated in step 914 and/or the at least one separateness measure evaluated in step 916 may include one more global measures and one or more local measures. A global measure is one that is evaluated over all of the samples in an accumulating sequence of dither values. A local measure is one that is evaluated over one or more proper subsets of the samples in an accumulating sequence of dither values.

Entropy as a Global Measure of Randomness

One example of a global measure of randomness that may be employed in embodiments is to quantify the entropy represented by the samples in an accumulating sequence of dither values. FIG. 11 provides an equation 1100 (the Shannon entropy equation) that may be used to quantify the entropy in such a sequence. In equation 1100, $p_i$ represents the probability of seeing a particular sample i when a sample is chosen from a set of possible samples S, and where the summation is over i=1 to S. The equation, of course, assumes that the probability distribution of S is known. During process 900, however, the probability distribution of S is not known a priori. The probability distribution may nevertheless be estimated empirically as the process is performed, based on the dither values that have already been accumulated into the sequence at the time when the entropy measure is computed.

Any of a variety of known techniques may be used to estimate the probability distribution of an accumulating sequence of values. A basic technique for estimating such a distribution is simply to count the existing occurrences of each dither value in the sequence and to divide the count by the total number of dither values in the sequence:

$$\text{probability estimator for sample } i = n_i/N$$

where $n_i$ represents the number of occurrences of a particular dither value i and N represents the number of dither values in the sequence. As persons of skill in the art will appreciate, however, a wide variety of other techniques have been developed for estimating a probability distribution based on a set of samples. Any of such techniques may be employed when using equation 1100 to quantify the entropy in an accumulating set of dither values.

Variance as a Global Measure of Separation

One example of a global measure of separateness that may be employed in embodiments is to quantify the variance among the samples in an accumulating sequence of dither values. FIG. 12 provides an equation 1200 that may be used to quantify the variance in such a sequence. Equation 1200 simply requires determining the mean value t over the set of samples L, to find the difference between each sample $t_i$ and the mean, and to sum the square of those differences. When computing the variance globally over an entire sequence of dither values, L will be equal to the number of dither values in the sequence.

Local Measures of Randomness: Statistical Attributes

Referring again to FIG. 10, randomness in a sequence of dither values may also be quantified using one or more statistical attributes as local measures. Two examples of such measures are decorrelation and non-periodicity.

We can define "crosstalk" in a seismic record as the interference caused in reflected energy from a target source by reflected energy from other sources activated closely in time with the target source. Similarly, we can define crosstalk among source activation times in a sequence of dither times as follows in the time-space domain:

$$x(t, n) = \delta(t - t_n)$$

Expressed in the frequency-space domain, this expression becomes:

$$x(f,n) = e^{-j2\pi f t_n}$$

Now define a function h(n) at a reference frequency $f_0$ of approximately 31 Hz, as follows:

$$h(n) = x(f_0, n)$$

If a sequence of dither times is to be truly random, then h(n) should have a flat spectrum in the frequency-wavenumber domain. Stated differently, H, which represents h(n) transformed to the frequency-wavenumber domain, should have a flat spectrum:

$$H = |FFT(h)|$$

Using the above observations, the equations of FIG. 13 and FIG. 14 provide techniques for quantifying the degree of spectral flatness of h(n) in the frequency-wavenumber domain for a sequence of dither values. Specifically, equation 1300 in FIG. 13 quantifies decorrelation locally in a sequence of dither values, and equation 1400 in FIG. 14 quantifies non-periodicity in H.

In equation 1300, Rh (m) represents the autocorrelation of h(n) at a lag m. The quantity may be computed over a window of lags m from 1 to M. In equation 1400, Q represents an ascending sort of the values in H. The quantity may be computed over a window of frequencies f from 1 to F, where F may be, for example, 80% of the Nyquist limit frequency.

Maximizing the measures of FIGS. 13 and 14 leads to maximizing the randomness in a sequence of dither values $\Phi_L$.

Local Measures of Separation: Distance Attributes

Referring once again to FIG. 10, separation in a sequence of dither values may also be quantified using one or more distance attributes as local measures. Three examples of such measures are minimum distance, average distance, and inverse duplication rate.

FIG. 15 provides an equation 1500 that may be used to quantify minimum distance between dither values in a sequence of dither values $\Phi_L$. The equation may be evaluated over a local window of L samples in a sequence of dither values by computing the absolute difference $|t_i-t_j|$ between all possible pairs of values in the window where $i \neq j$, and then taking the minimum of the absolute differences.

FIG. 16 provides an equation 1600 that may be used to quantify average distance between dither values in a sequence of dither values $\Phi L$. The equation may be evaluated by summing the absolute differences $|t_i-t_j|$ between all adjacent pairs i, j=i+1 over a local window of L samples in the sequence of dither values, and then multiplying the sum by the quantity 2/L(L−1), where L represents the number of samples in the window.

FIG. 17 provides an equation 1700 that may be used to quantify the inverse duplication rate exhibited by a local window of L samples in a sequence of dither values $\Phi_L$. In equation 1700, the expression $I(|t_i-t_j| \geq \text{dist})$ represents a binary function that evaluates to 1 if the absolute difference $|t_i-t_j|$ for a given pair of dither values is greater than or equal to a threshold distance "dist," and evaluates to 0 otherwise. The overall equation may be evaluated by summing the value of the binary function I over all adjacent pairs i, j=i+1 over a local window of L samples in the sequence of dither values, and then multiplying the sum by the quantity 2/L(L−1), where L represents the number of samples in the window.

Constraints on Dither Values and/or Dither Differences

As was mentioned above, in some embodiments, one or more constraints may be imposed that must be satisfied for a given candidate dither value to be selected for addition to an accumulating sequence of dither values. FIGS. 18, 19, and 20 describe three examples of such constraints, any one or more of which may be used in embodiments.

FIG. 18 describes a dither time constraint 1800. According to constraint 1800, all dither values $t_i$ in a sequence of dither values must be greater than or equal to a minimum dither value $T_{min}$ (for example, 0) and must be less than or equal to a maximum dither value $T_{max}$ (for example, 1 second). The values of $T_{min}$ and $T_{max}$ may be specified by the designers of a given survey.

FIG. 19 describes a dither difference constraint 1900. According to constraint 1900, the dither difference $\tau_i - \tau_{i-1}$ for all adjacent pairs of dither values in a sequence of dither values must exceed a threshold dither difference $T_{cut}$. The value of $T_{cut}$ may be specified by the designers of a given survey.

FIG. 20 describes a different dither difference constraint 2000. According to constraint 2000, the absolute dither difference $|\tau_i-\tau_j|$ must exceed a threshold dither difference $D_{th}$ for all possible pairs of dither values i, j in a dither sequence, where i≠j. The constraint may be evaluated over one or more windows of L consecutive samples in the sequence. The value of $D_{th}$, as well as the size of the window L over which the constraint must be satisfied, may be specified by the designers of a given survey.

Profit Function for Evaluating Randomness and Separation in Dither Value Sequences In some embodiments, a profit function may be employed to quantify the randomness and separation represented by a sequence of dither values. FIGS. 21-24 provide an example set of equations the may be used to implement such a profit function. In various embodiments, other profit functions may be used. Such embodiments may include more terms, fewer terms, or different terms.

Equation 2100 in FIG. 21 describes a per-source sequence of dither values $T_{src}$ for a given source src to be used in a survey that may employ more than one source in a blended marine seismic acquisition. As was explained above, the indices of the dither values in per-source sequence $T_{src}$ refer to indices of dither values in a per-shot sequence of dither values that includes all shots to be performed during a segment of the survey. As was also explained above, the notation used for the indices takes into account a desired source activation pattern to be used among the potentially N sources in the survey segment.

Equation 2200 in FIG. 22 describes a per-source sequence of dither differences $\Omega_{src}$ for a given source src to be used in a survey that may employ more than one source in a blended marine seismic acquisition. As is the case for sequence $T_{src}$, the indices of the dither differences in per-source sequence $\Omega_{src}$ refer to indices of dither differences in a per-shot sequence of dither differences that includes all shots to be performed during a segment of the survey. The notation used for the indices takes into account a desired source activation pattern to be used among the potentially N sources in the survey. Each value $t_i$ in sequence $\Omega_{src}$ represents the difference between two consecutive dither values for source src in sequence $T_{src}$.

Given all of the equations described above, a profit function such as profit function 2300 given in FIG. 23 may be defined to quantify randomness and separation in one or more sequences of dither values. According to example profit function 2300, a per-source profit value $\theta(\Omega_{src})$ may comprise a weighted sum of one or more of the randomness and separation measures described above. In the example of FIG. 23, the profit value corresponds to a weighted sum of the entropy exhibited by dither value sequence $T_{src}$ globally, the variance exhibited by dither difference sequence $\Omega_{src}$ globally, and the decorrelation, non-periodicity, minimum distance, average distance, and inverse duplication rates exhibited by dither difference sequence $\Omega_{src}$ locally over a window of samples L. The value of L may be specified by the designers of a given survey. As the equation indicates, each term in the sum may be weighted by a separate weighting value $\alpha_k$, where k ranges from 1 to the number of terms selected for use in the profit function. The value of each weighting value may be specified by the designers of a given survey. In various embodiments, different terms and different numbers of terms may be included in such a profit function, and different weighting values may be used for each term.

Referring now to FIG. 24, equation 2400 may be used in step 902 of process 900 to determine which of several candidate dither value sequences should be chosen as a final sequence to be generated by generator 602 and stored in medium 604 of system 600. According to equation 2400, the chosen sequence of dither values $\{\hat{\tau}_1, \hat{\tau}_2, \ldots, \hat{\tau}_{N_{sp}}\}$ should be the sequence that maximizes the sum of all the per-source profit values $\theta(\Omega_{src})$ for the sources that will be used during the survey segment.

Dynamic Programming Technique for Determining Dither Value Sequences Efficiently As was explained above, in various embodiments, sequence generator 602 may be designed to generate dither value sequences according to equation 2400. If the generator were designed to use a brute force method for doing so, however, the processing cost would be exponential in the number of shot points for which dither values need to be determined. Specifically, the processing cost would be $K^{(N_{sp}-1)}$, where K is the number of candidate dither values in the fixed set of candidate dither values 602 and $N_{sp}$ is the number of shot points to be determined. To improve the functioning of generator 602 (or that of a computing device executing software that implements generator 602), the generator can instead be designed to complete the task in a time that is merely quadratic in the number of candidate dither values in the fixed set of candidate dither values: $(N_{sp}-2)K^2+2K$. To do so, system 600 may be designed to perform a dynamic programming procedure in one or more processing cycles, where each such processing cycle determines dither values for all of the shots that are to be executed in a given survey segment.

For a given processing cycle, such a dynamic programming procedure may employ a two-dimensional grid of nodes indexed by shot numbers in the first dimension and by fixed dither values in the second dimension, such that each node in the grid represents a unique shot number and dither value pair.

Figure 25:
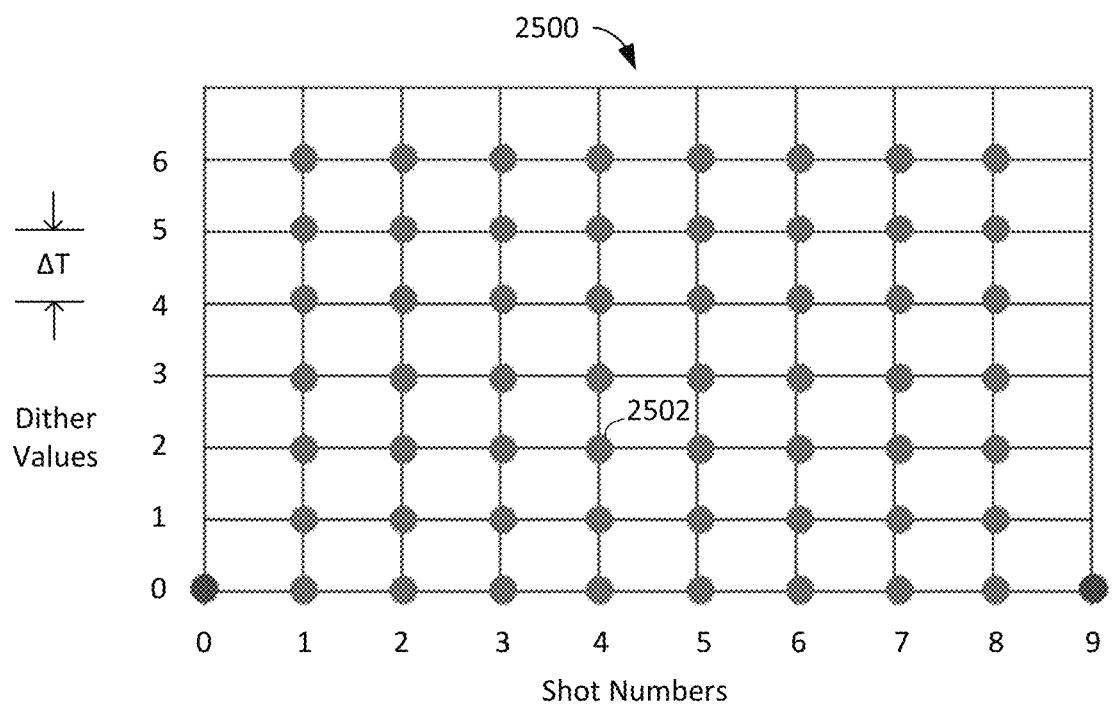
FIG. 25 is a graph illustrating an example grid structure that may be employed by the system of FIG. 6 according to some embodiments for generating one or more sequences of dither values efficiently.

To facilitate explanation, FIG. 25 presents an example such grid 2500. The nodes in grid 2500 are indexed by shot numbers along the horizontal axis and by fixed dither values along the vertical axis. Only ten shot numbers are included in grid 2500 so as not to overly complicate the drawing. In actual embodiments, the number of shot points to be determined in a processing cycle would more typically be on the order of 3,000 to 5,000. Similarly, while seven representative fixed dither values are shown on the vertical axis of the drawing for purposes of illustration, in practice any number of fixed dither values may be used, and the fixed dither values may differ from one another according to any appropriate increment. According to one non-limiting example, the fixed dither values may begin at 0 msec and increase in regular increments of $\Delta T$, where $\Delta T$ represents a time increment such as 0.1 msec selected by survey designers. (Note that the $\Delta T$ used in the example is not related to the $\Delta T$ described above in relation to FIG. 5.) In various embodiments, any units (including spatial or temporal units) may be used for the dither values, and any suitable number of fixed values and increments between them may be chosen. As grid 2500 illustrates, in an example procedure, the first and last columns in the grid may each contain only a single node, while each of the remaining columns may contain one node for each of the fixed candidate dither values in set 620.

Observe that any node in the grid can be uniquely identified by a pair (i, j), where i designates the row and j designates the column of the node. Because rows in the grid correspond to dither values and columns correspond to shot numbers, each node in the grid therefore corresponds to a certain dither value and shot number. Node 2502, for example, corresponds to dither value 2ΔT and to shot number 4. It follows that any series of nodes that contains a single node from each column, in increasing or decreasing order by column number, uniquely identifies a dither value sequence for a corresponding sequence of shot numbers. Observe further that any such series of nodes may be identified by a path drawn through the grid that passes through one node in each column, such as the path indicated by arrows in FIG. 26. The objective of the dynamic programming procedure, then, is to find the one such path through the grid that yields the highest value of profit function 2400 for the dither value sequence the path represents.

This may be done by establishing an appropriate data structure to represent each of the nodes in the grid, and by populating the data structures by columns, beginning with the second column and proceeding from left to right to the last column, completing the nodes in each row of a given column before proceeding to the next column. The procedure for populating the data structure for each node (i, j) is to select the one node (x, j−1) from the previous column that would yield the highest profit value if the dither value corresponding to node (i, j) were appended to the dither value sequence corresponding to node (x, j−1).

Figure 27:
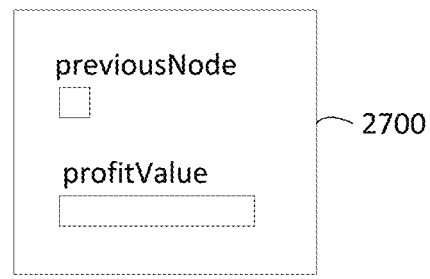
FIG. 27 is a block diagram schematically illustrating an example data structure that may be employed in association with the grid structure of FIG. 25 according to some embodiments.

An example per-node data structure suitable for this purpose is shown in FIG. 27. In data structure 2700, a previousNode field is provided to contain a pointer to a node in the previous column, and a profitValue field is provided to contain the result of evaluating equation 2400 for the dither value sequence that ends with the current node. The latter sequence may be determined by following the pointers from the current node back to first node in the grid (to the single node in column 0 from which all sequence paths originate). In various embodiments, different data structures may be used.

Figure 28:
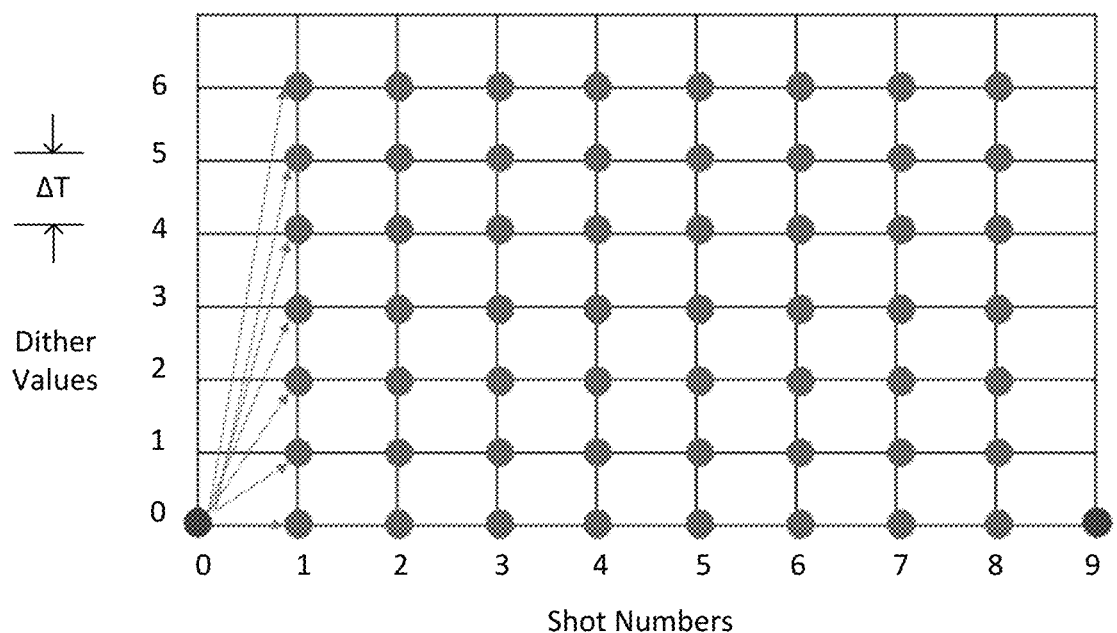
FIG. 28 is a view of the grid structure of FIG. 25 illustrating node processing for the nodes in a first column thereof according to some embodiments.

FIG. 28 illustrates performance of the node processing step for the nodes of column 1. For the nodes in this column, the processing is trivial. Because column 0 contains only a single node (0, 0), this node is selected to be the prior node for each of nodes (0, 1) to (6, 1). Based on that selection, a pointer to node (0, 0) is stored in the previousNode field for each of nodes (0, 1) to (6, 1), and the corresponding profit values are computed and stored in the profit Value fields associated with the respective nodes (0, 1) to (6, 1). For example, the profit value stored in node (0, 1) would be the result of evaluating equation 2400 for the per-shot dither value sequence {0, 0}, the profit value stored in node (1, 1) would be the value of equation 2400 for the per-shot sequence {0, ΔT}, the profit value stored in node (2, 1) would be the value of equation 2400 for the per-shot sequence {0, 2ΔT}, and so on. Once the processing for column 1 has been completed, the values stored in any given node of column 1 will represent the highest profit sequences that begins with node (0, 0) and end with the given node. In the case of the nodes in column 1, this will be true because there was only one possible such sequence for each node.

Processing for the nodes in columns 2-9 may be performed in accordance with the loop inside box 904 as described above, with the minor exception that only a single node exists in column 9 of the grid, such that only a single candidate dither value is considered for each accumulating sequence when the node in column 9 is processed.

Figure 29:
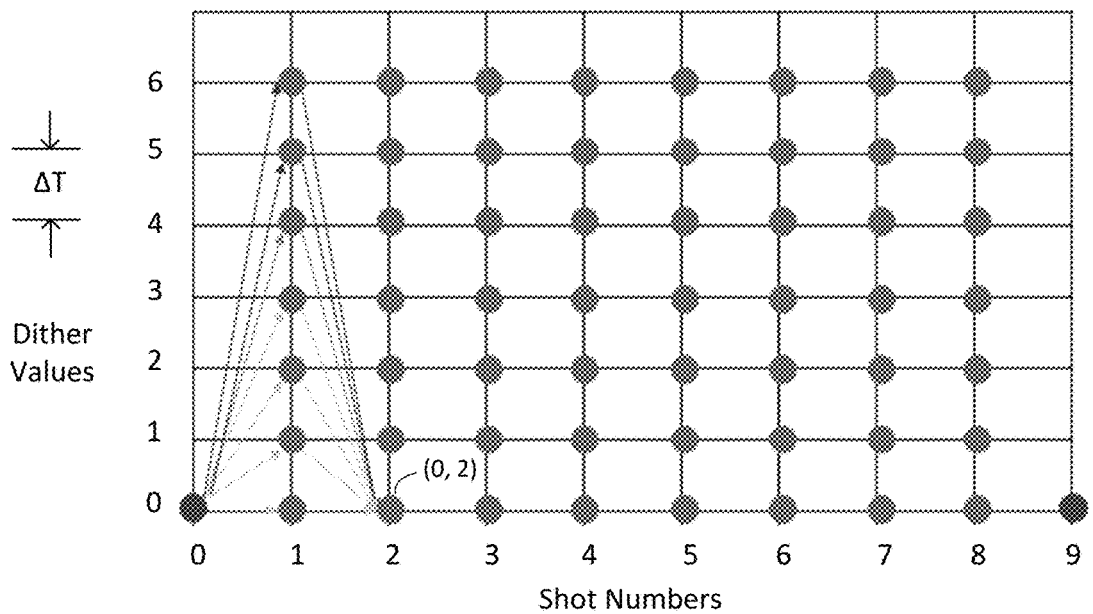
FIG. 29 is a view of the grid structure of FIG. 25 illustrating node processing for one of the nodes in a second column thereof according to some embodiments.

FIG. 29 illustrates the node processing step for node (0, 2) as a representative example. As was explained above, the objective for processing node (0, 2) is to select the one node (x, 1) from column 1 that would yield the highest value of equation 2400 if the dither value corresponding to node (0, 2) were appended to the overall dither value sequence represented by node (x, 1). Note, however, that evaluating equation 2400 requires summing a set of per-source profit values, where each of the per-source profit values corresponds to an evaluation of equation 2300. Thus, in order to evaluate equation 2400, the per-shot dither value sequence represented by node (x, 1) with node (0,2) appended thereto must be considered as a an equivalent set of per-source sequences. As was explained above, the equivalence between an overall sequence of dither values and a corresponding set of per-source dither value sequences may be determined by the known source activation pattern that is to be used in the given survey segment.

Figure 30:
FIG. 30 is a block diagram schematically illustrating an example array of per-source sequence sets that may be utilized by the system of FIG. 6 while performing node processing in the grid structure of FIG. 25 according to some embodiments.

FIG. 30 illustrates an array 3000 of per-source sequence sets, where the array contains one per-source sequence set for each of the nodes in column 1 that must be considered in order to process node (0, 2). For this example, the first per-source sequence set in the array corresponds to node (0, 1) the second per-source sequence set corresponds to node (1, 1), the third to node (2, 1), and so on. To complete the processing for node (0, 2), the per-source sequence set for each of the nodes in column 1 is determined, and equation 2400 is evaluated for each set. The results of evaluating equation 2400 for each per-source sequence set may be stored for comparison with similar results determined for each of the other per-source sequence sets. For example, if desired, the results may be written into a respective sumOfPerSourceProfitValues field associate with each per-source sequence sets as shown.

For embodiments that employ constraints, if it is determined that the candidate dither value sequence for a given combination of nodes (x, 1) and (0, 2) does not satisfy one or more of the predetermined constraints (such as either of constraints 1800, 1900, or 2000 discussed above), then the corresponding node (x, 1) may be disregarded from consideration during the processing of node (0, 2). In the latter case, if desired, a suitable profit value representing-o ("negative infinity") may be written to the sumOfPerSourceProfitValues field associated with the corresponding per-source sequence set to ensure that the node is disregarded.

Figure 31:
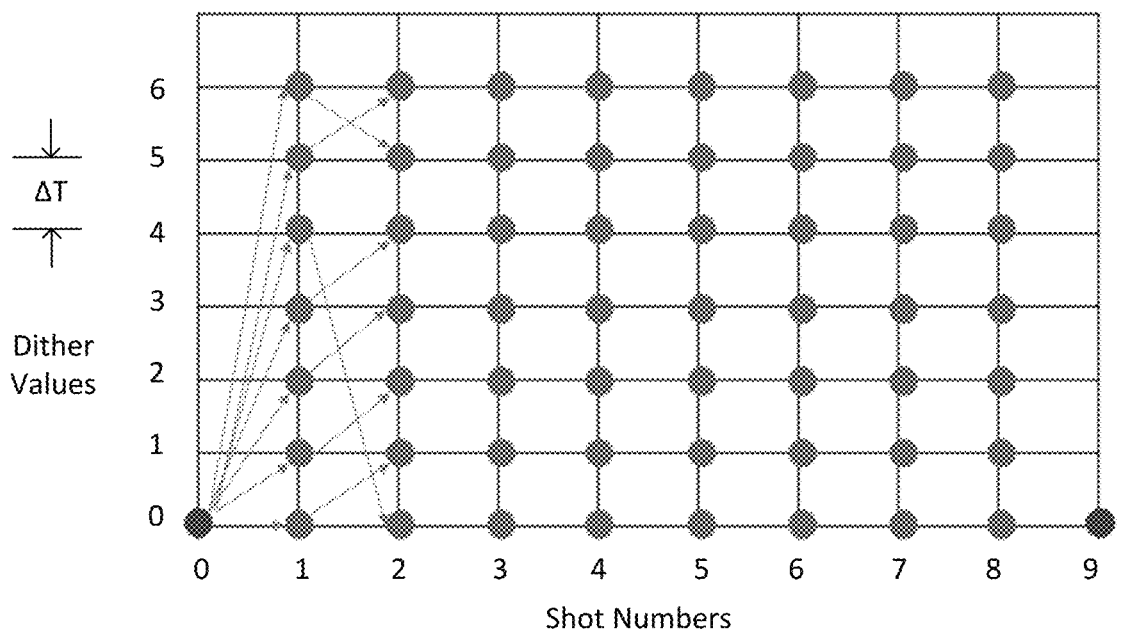
FIG. 31 is a view of the grid structure of FIG. 25 illustrating a state of the grid after node processing has been completed for the nodes in the second column of the grid according to some embodiments.

Once profit values have been determined for each of the candidate sequence sets, the set with the highest profit value is selected. Based on the selection, the corresponding profit value may be written into the profit Value field of data structure 2700 for node (0, 2), and a pointer to the selected node from column 1 may be written into the previousNode field of the data structure. Processing may then continue in a similar manner with the remaining nodes in column 2 until all of the nodes of column 2 have been completed, as shown in FIG. 31.

Figure 32:
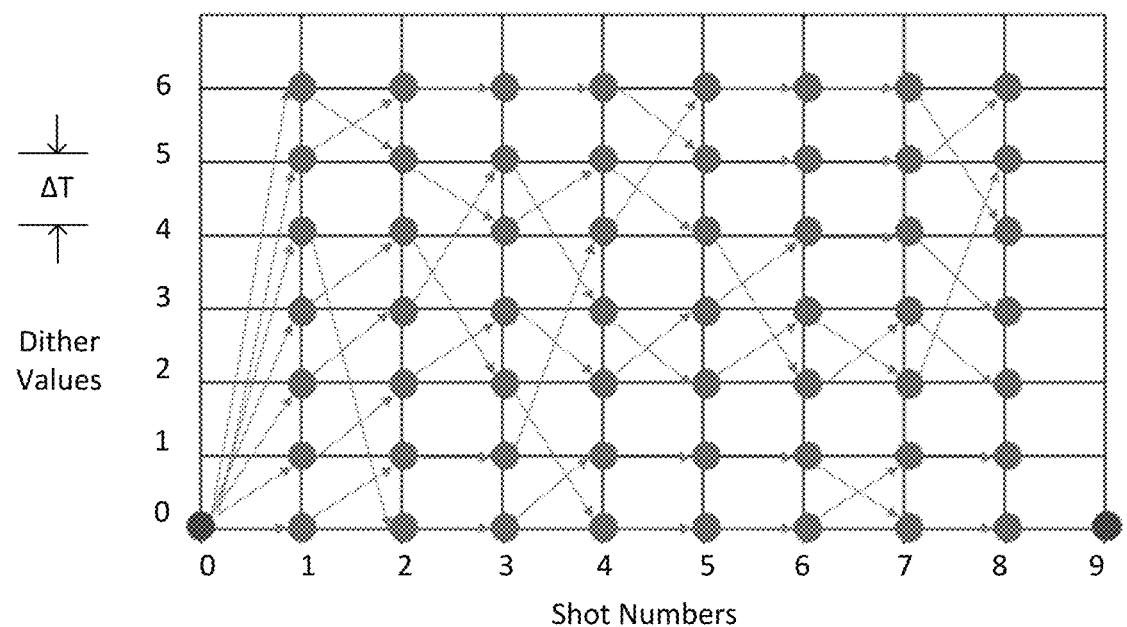
FIG. 32 is a view of the grid structure of FIG. 25 illustrating a state of the grid after node processing has been completed for the nodes in all but the last column of the grid according to some embodiments.

After all of the nodes in column 2 have been processed, processing continues in a similar manner with all of the nodes in column 3, then all of the nodes in column 4, and so on until the penultimate column (in this example, column 8) has been completed. Because each node in a previously completed column represents the highest profit sequence ending with that node, and because all such nodes are taken into account when selecting a candidate sequence for the nodes in a subsequent column, it follows that each node in any completed column represents the highest profit sequence ending with that node. FIG. 32 illustrates the state of the grid after processing of the column 8 has been completed. Observe that each of the nodes in column 8 represents one of the n accumulating candidate sets of dither values referred to in process 900.

Figure 26:
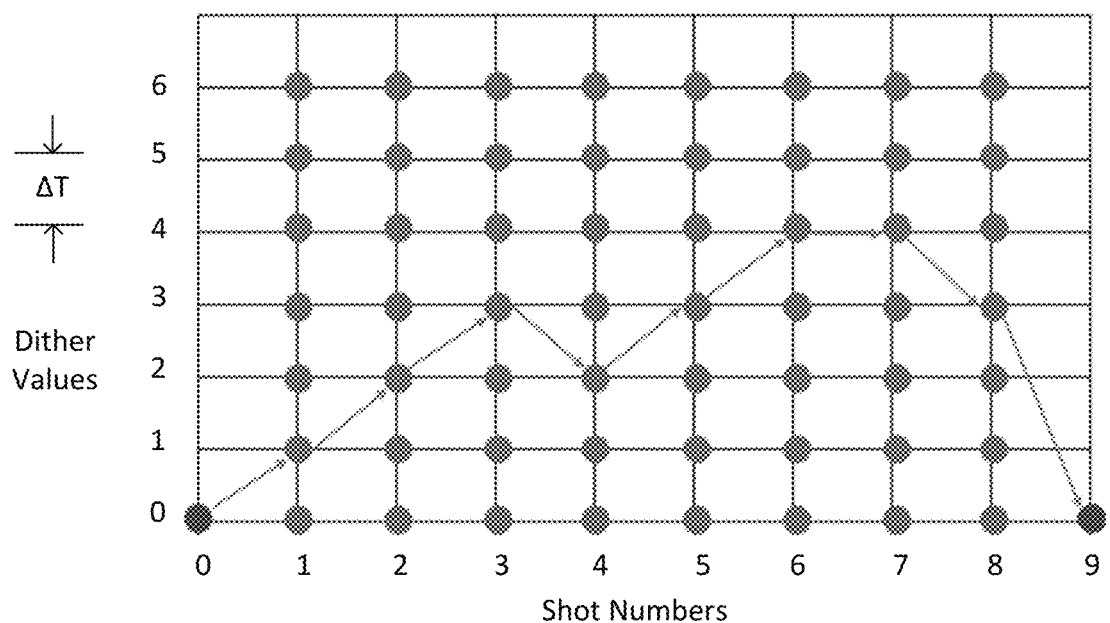
FIG. 26 is a view of the grid structure of FIG. 25 with a sequence of dither values indicated thereon by a path that passes through nodes in the grid according to some embodiments.
Figure 33:
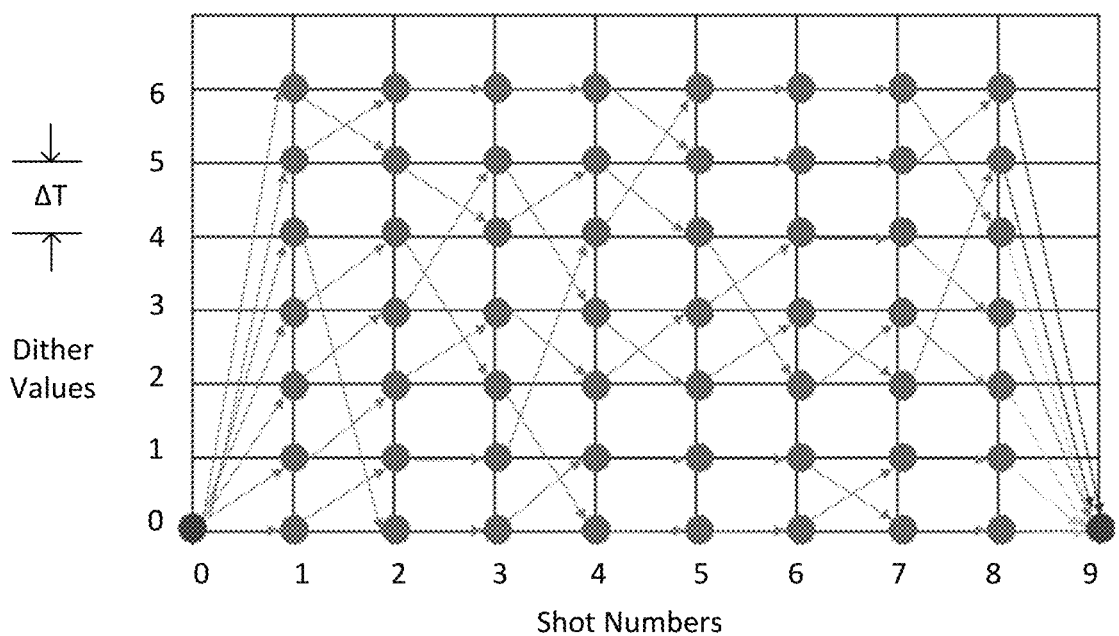
FIG. 33 is a view of the grid structure of FIG. 25 illustrating node processing for the last column of the grid according to some embodiments.

Finally, as illustrated in FIG. 33, the single node in the last column is processed according to the same procedure that was used to process the nodes in columns 1 to 8, except that in the case of the last node only a single candidate dither value is considered for addition to each of the n accumulating sequences of column 8. Once a single node from column 8 has been selected to become the previous node for the node in column 9, a single path through the grid is established, as indicated in FIG. 26. That path, in turn, determines a per-shot dither value sequence that generator 602 may output in step 804 and that may be written to non-transitory medium 604 of system 600. As was described above, if desired, the per-shot dither value sequence selected may be translated into an equivalent set of per-source dither value sequences, or into any of a variety of suitable source activation indicators, and the latter may be written to medium 604 in lieu of or in addition to the per-shot sequence.

Multiple specific embodiments have been described above and in the appended claims. Such embodiments have been provided by way of example and illustration. Persons having skill in the art and having reference to this disclosure will perceive various utilitarian combinations, modifications and generalizations of the features and characteristics of the embodiments so described. For example, steps in methods described herein may generally be performed in any order, and some steps may be omitted, while other steps may be added, except where the context clearly indicates otherwise. Similarly, components in structures described herein may be arranged in different positions or locations, and some components may be omitted, while other components may be added, except where the context clearly indicates otherwise. The scope of the disclosure is intended to include all such combinations, modifications, and generalizations as well as their equivalents.

What is claimed is:

1. In a technological process for controlling impulsive source activations in a marine seismic survey of the kind in which reflected energy from two or more sources is recorded in a blended fashion and is later separated during a deblending operation, and in which a control system executes dithered shot points during the survey responsive to stored source activation indicators, the specific improvement of causing one or more computing devices to perform actions comprising:

generating a sequence of dither values deterministically; and storing the sequence of dither values or a sequence of source activation indicators derived therefrom in a non-transitory medium readable by the control system;

wherein generating the sequence of dither values comprises iteratively selecting from a fixed set of candidate dither values to produce a candidate sequence of dither values; and wherein the selecting is based on evaluating one or more quantitative measures of randomness and one or more quantitative measures of separation exhibited by at least a portion of the candidate sequence of dither values;

whereby results of the deblending operation are improved by reducing coherence exhibited by the sequence of dither values or by the sequence of source activation indicators derived therefrom.

2. The process of claim 1, wherein:
the dither values comprise at least one of: dither times or dither distances.

3. The process of claim 1, wherein:
the source activation indicators comprise at least one of: shot times, shot locations, dither times, or dither distances.

4. The process of claim 1, wherein:
the one or more quantitative measures of randomness comprise at least one global randomness measure evaluated over all of the dither values in the candidate sequence of dither values and at least one local randomness measure evaluated over a proper subset of the candidate sequence of dither values.

5. The process of claim 1, wherein:
the one or more quantitative measures of separation comprise at least one global separation measure evaluated over all of the dither values in the candidate sequence of dither values and at least one local separation measure evaluated over a proper subset of the candidate sequence of dither values.

6. The process of claim 1, wherein:
the one or more quantitative measures of randomness comprise an entropy measure.

7. The process of claim 6, wherein:
the entropy measure comprises a global entropy measure evaluated over all of the dither values in the candidate sequence of dither values.

8. The process of claim 1, wherein:
the one or more quantitative measures of separation comprise a variance measure.

9. The process of claim 8, wherein:
the variance measure comprises a global variance measure evaluated over all of the dither values in the candidate sequence of dither values.

10. The process of claim 1, wherein:
the one or more quantitative measures of randomness comprise one or more local randomness measures evaluated over a proper subset of the candidate sequence of dither values.

11. The process of claim 10, wherein:
the local randomness measures comprise at least one of: a decorrelation measure and a non-periodicity measure.

12. The process of claim 1, wherein:
the one or more quantitative measures of separation comprise one or more local separation measures evaluated over a proper subset of the candidate sequence of dither values.

13. The process of claim 12, wherein:
the local separation measures comprise at least one of: a minimum distance measure, an average distance measure, and an inverse duplicate rate measure.

14. The process of claim 1, wherein:
the selecting further comprises determining whether selecting a given one of the candidate dither values would violate one or more predetermined constraints and, if so, not selecting the given candidate dither value.

15. A system for controlling impulsive source activations in a marine seismic survey, comprising:

a machine configured to generate a sequence of dither values deterministically and to store the sequence of dither values, or a sequence of source activation indicators derived therefrom, in a non-transitory readable medium, wherein the non-transitory medium is readable by a control system operable to activate impulsive marine seismic sources;

wherein the machine comprises an iterative selector configured to generate the sequence of dither values iteratively by selecting from a fixed set of candidate dither values to produce a candidate sequence of dither values; and wherein the iterative selector is further configured to select from the fixed set of candidate dither values based on evaluating one or more quantitative measures of randomness and one or more quantitative measures of separation exhibited by at least a portion of the candidate sequence of dither values.

16. The system of claim 15, wherein:
the dither values comprise at least one of: dither times or dither distances.

17. The system of claim 15, wherein:
the source activation indicators comprise at least one of: shot times, shot locations, dither times, or dither distances.

18. The system of claim 15, wherein:
the one or more quantitative measures of randomness comprise at least one global randomness measure evaluated over all of the dither values in the candidate sequence of dither values and at least one local randomness measure evaluated over a proper subset of the candidate sequence of dither values.

19. The system of claim 15, wherein:
the one or more quantitative measures of separation comprise at least one global separation measure evaluated over all of the dither values in the candidate sequence of dither values and at least one local separation measure evaluated over a proper subset of the candidate sequence of dither values.

20. The system of claim 15, wherein:
the one or more quantitative measures of randomness comprise an entropy measure.

21. The system of claim 20, wherein:
the entropy measure comprises a global entropy measure evaluated over all of the dither values in the candidate sequence of dither values.

22. The system of claim 15, wherein:
the one or more quantitative measures of separation comprise a variance measure.

23. The system of claim 22, wherein:
the variance measure comprises a global variance measure evaluated over all of the dither values in the candidate sequence of dither values.

24. The system of claim 15, wherein:
the one or more quantitative measures of randomness comprise one or more local randomness measures evaluated over a proper subset of the candidate sequence of dither values.

25. The system of claim 24, wherein:
the local randomness measures comprise at least one of: a decorrelation measure and a non-periodicity measure.

26. The system of claim 15, wherein:
the one or more quantitative measures of separation comprise one or more local separation measures evaluated over a proper subset of the candidate sequence of dither values.

27. The system of claim 26, wherein:
the local separation measures comprise at least one of: a minimum distance measure, an average distance measure, and an inverse duplicate rate measure.

28. The system of claim 15, wherein:
the iterative selector is further configured to determine whether selecting a given one of the candidate dither values would violate one or more predetermined constraints and, if so, not to select the given candidate dither value.

29. A non-transitory computer readable medium having instructions stored thereon that, when executed by one or more processors, cause the one or more processors to perform steps comprising:

generating a sequence of dither values deterministically; and storing the sequence of dither values or a sequence of source activation indicators derived therefrom in a non-transitory medium readable by a control system that is operable to activate impulsive marine seismic sources;

wherein generating the sequence of dither values comprises iteratively selecting from a fixed set of candidate dither values to produce a candidate sequence of dither values; and wherein the selecting is based on evaluating one or more quantitative measures of randomness and one or more quantitative measures of separation exhibited by at least a portion of the candidate sequence of dither values.

30. The medium of claim 29, wherein:
the dither values comprise at least one of: dither times or dither distances.

31. The medium of claim 29, wherein:
the source activation indicators comprise at least one of: shot times, shot locations, dither times, or dither distances.

32. The medium of claim 29, wherein:
the one or more quantitative measures of randomness comprise at least one global randomness measure evaluated over all of the dither values in the candidate sequence of dither values and at least one local randomness measure evaluated over a proper subset of the candidate sequence of dither values.

33. The medium of claim 29, wherein:
the one or more quantitative measures of separation comprise at least one global separation measure evaluated over all of the dither values in the candidate sequence of dither values and at least one local separation measure evaluated over a proper subset of the candidate sequence of dither values.

34. The medium of claim 29, wherein:
the one or more quantitative measures of randomness comprise an entropy measure.

35. The medium of claim 34, wherein:
the entropy measure comprises a global entropy measure evaluated over all of the dither values in the candidate sequence of dither values.

36. The medium of claim 29, wherein:
the one or more quantitative measures of separation comprise a variance measure.

37. The medium of claim 36, wherein:
the variance measure comprises a global variance measure evaluated over all of the dither values in the candidate sequence of dither values.

38. The medium of claim 29, wherein:
the one or more quantitative measures of randomness comprise one or more local randomness measures evaluated over a proper subset of the candidate sequence of dither values.

39. The medium of claim 38, wherein:
the local randomness measures comprise at least one of: a decorrelation measure and a non-periodicity measure.

40. The medium of claim 29, wherein:
the one or more quantitative measures of separation comprise one or more local separation measures evaluated over a proper subset of the candidate sequence of dither values.

41. The medium of claim 40, wherein:
the local separation measures comprise at least one of: a minimum distance measure, an average distance measure, and an inverse duplicate rate measure.

42. The medium of claim 29, wherein:
the selecting further comprises determining whether selecting a given one of the candidate dither values would violate one or more predetermined constraints and, if so, not selecting the given candidate dither value.

* * * * *